US010096015B2

(12) United States Patent
Bak et al.

(10) Patent No.: US 10,096,015 B2
(45) Date of Patent: *Oct. 9, 2018

(54) MOBILE TERMINAL AND CONTROLLING METHOD THEREOF

(71) Applicant: LG ELECTRONICS INC., Seoul (KR)

(72) Inventors: Sure Bak, Seoul (KR); Eunji Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,976

(22) Filed: Nov. 15, 2017

(65) Prior Publication Data

US 2018/0075439 A1 Mar. 15, 2018

Related U.S. Application Data

(63) Continuation of application No. 15/406,533, filed on Jan. 13, 2017, now Pat. No. 9,922,317, which is a
(Continued)

(30) Foreign Application Priority Data

Sep. 7, 2011 (KR) .................. 10-2011-0090847

(51) Int. Cl.
*G06Q 20/00* (2012.01)
*G06Q 20/32* (2012.01)
(Continued)

(52) U.S. Cl.
CPC ..... *G06Q 20/3224* (2013.01); *G06F 3/04883* (2013.01); *G06Q 20/20* (2013.01);
(Continued)

(58) Field of Classification Search
USPC .......................................... 705/72
See application file for complete search history.

(56) References Cited

U.S. PATENT DOCUMENTS 5,434,403 A 7/1995 Amir et al.
5,583,946 A 12/1996 Gourdol
(Continued)

FOREIGN PATENT DOCUMENTS

KR 1020030075062 9/2003
KR 1020100073743 7/2010
KR 1020110084865 7/2011

OTHER PUBLICATIONS

Korean Intellectual Property Office Application No. 10-2011-0090847, Notice of Allowance dated Mar. 20, 2017, 3 pages.
(Continued)

*Primary Examiner* — John Hayes
*Assistant Examiner* — John M Winter
(74) *Attorney, Agent, or Firm* — Lee, Hong, Degerman, Kang & Waimey PC

(57) ABSTRACT

A mobile terminal and controlling method thereof are disclosed, which facilitates a terminal to be used in further consideration of user's convenience. According to at least one of embodiments of the present invention, a strict authentication procedure for expense payment can be performed via a simple and convenient user interface between a mobile terminal and a terminal user. In particular, since at least one of a selection and authentication of a payment means of the mobile terminal can be performed via at least one of an aligned direction, a moving direction and a moving track of the mobile terminal, the user interface between the mobile terminal and the terminal user for the expense payment can be further simplified.

29 Claims, 22 Drawing Sheets

Related U.S. Application Data continuation of application No. 13/605,777, filed on Sep. 6, 2012.

(51) Int. Cl.

| | | |
|---|---|---|
| *G06Q 20/40* | (2012.01) | |
| *G06F 3/0488* | (2013.01) | |
| *H04M 1/725* | (2006.01) | |
| *G06Q 20/34* | (2012.01) | |
| *G06Q 20/20* | (2012.01) | |

(52) U.S. Cl.
CPC ..... *G06Q 20/3227* (2013.01); *G06Q 20/3229* (2013.01); *G06Q 20/3278* (2013.01); *G06Q 20/3572* (2013.01); *G06Q 20/405* (2013.01); *G06Q 20/4012* (2013.01); *H04M 1/7253* (2013.01); *H04M 2250/04* (2013.01); *H04M 2250/12* (2013.01); *H04M 2250/22* (2013.01)

(56) References Cited

U.S. PATENT DOCUMENTS

| | | | |
|---|---|---|---|
| 6,305,603 | B1 | 10/2001 | Grunbok, Jr. et al. |
| 7,515,135 | B2 | 4/2009 | Varanda |
| 7,562,813 | B2 | 7/2009 | Humphrey et al. |
| 8,340,577 | B2 | 12/2012 | Griffin et al. |
| 8,761,809 | B2 | 6/2014 | Faith et al. |
| 2005/0015618 | A1 | 1/2005 | Schneider et al. |
| 2007/0150842 | A1* | 6/2007 | Chaudhri ............ G06F 3/04883 715/863 |
| 2007/0278290 | A1 | 12/2007 | Messerges et al. |
| 2009/0210308 | A1 | 8/2009 | Toomer et al. |
| 2010/0217707 | A1 | 8/2010 | Phillips |
| 2011/0010283 | A1* | 1/2011 | Williams ............ G06Q 20/352 705/35 |
| 2011/0159857 | A1 | 6/2011 | Faith et al. |
| 2011/0187642 | A1 | 8/2011 | Faith et al. |
| 2011/0189981 | A1 | 8/2011 | Faith et al. |
| 2011/0195748 | A1 | 8/2011 | Main et al. |
| 2013/0060687 | A1 | 3/2013 | Bak et al. |
| 2013/0095887 | A1 | 4/2013 | Chang et al. |
| 2017/0148010 | A1 | 5/2017 | Bak et al. |

OTHER PUBLICATIONS

Clark, "Electronic Wallets: Past, Present and Future," www.GPayments.com, XP55045746, Nov. 2012, 12 pages.
European Patent Office Application Serial No. 12182966.7, Search Report dated Feb. 10, 2016, 9 pages.

* cited by examiner

FIG. 4
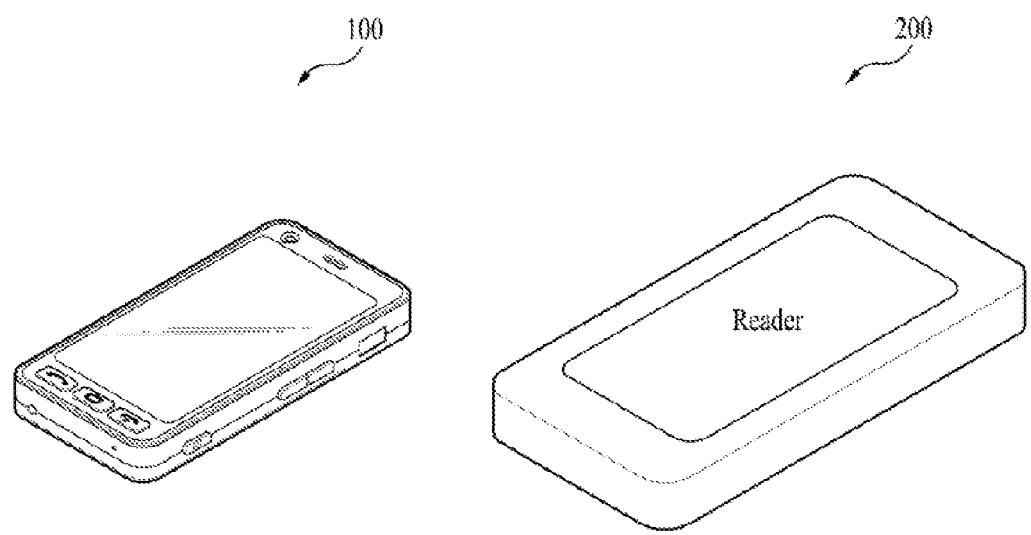
(4-1)
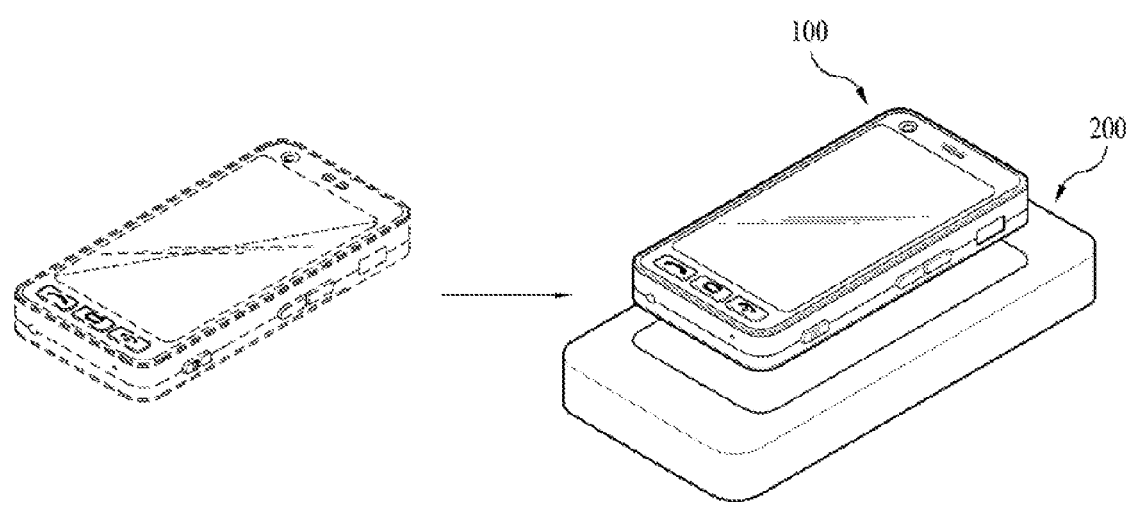
(4-2)

FIG. 12
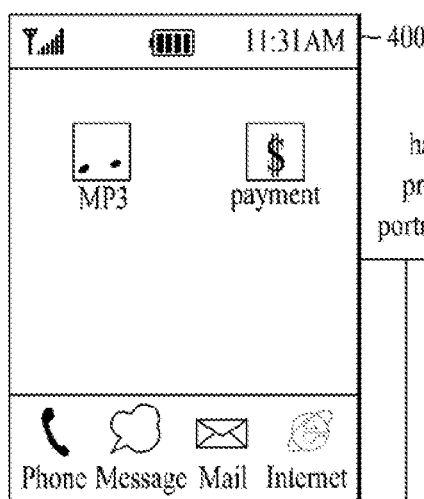
(12-1)
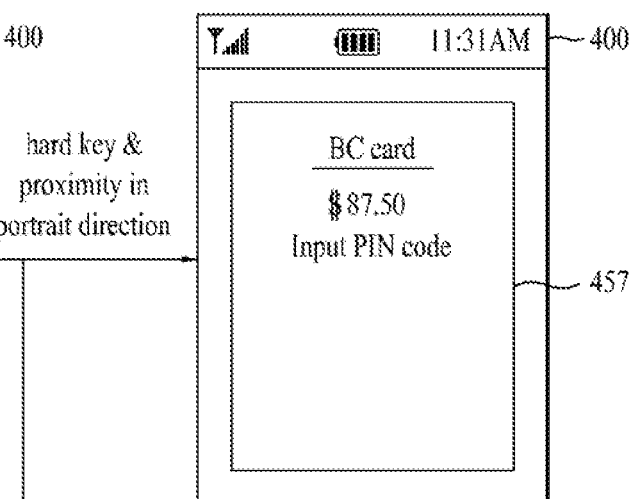
(12-2)
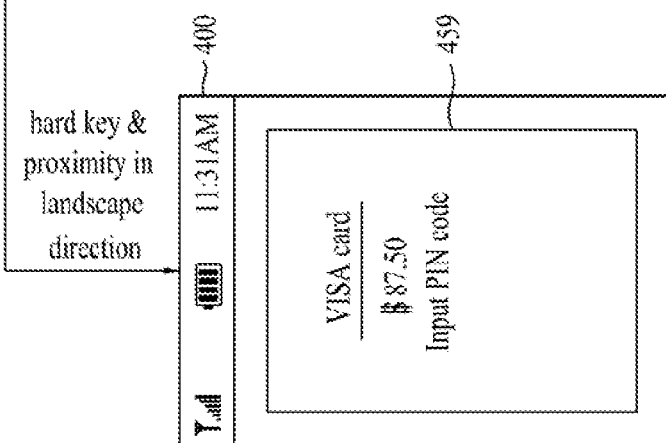
(12-3)

FIG. 20
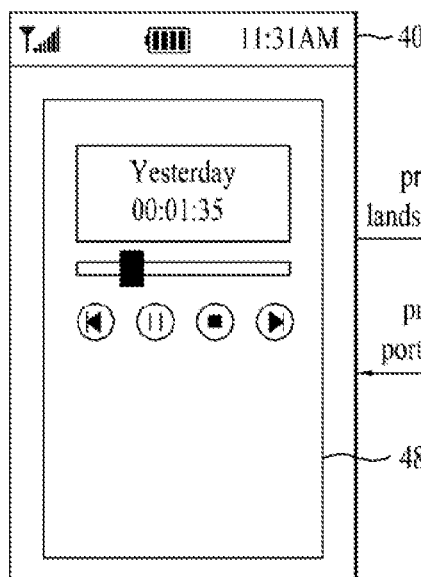
(20-1)
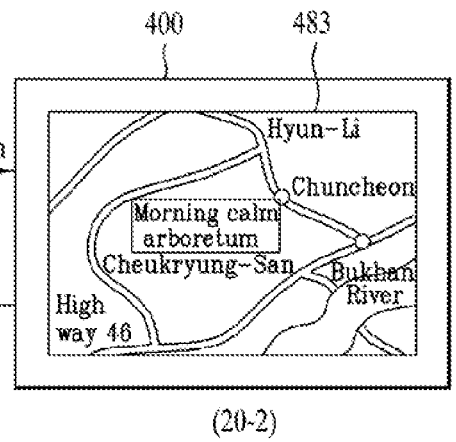
proximity in landscape direction →
← proximity in portrait direction
(20-2)
(20-3)
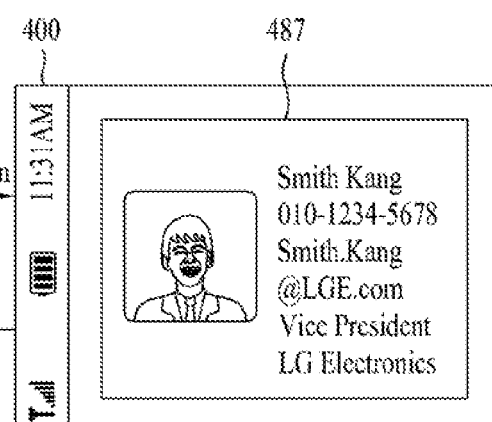
proximity in landscape direction →
← proximity in portrait direction
(20-4)

FIG. 22
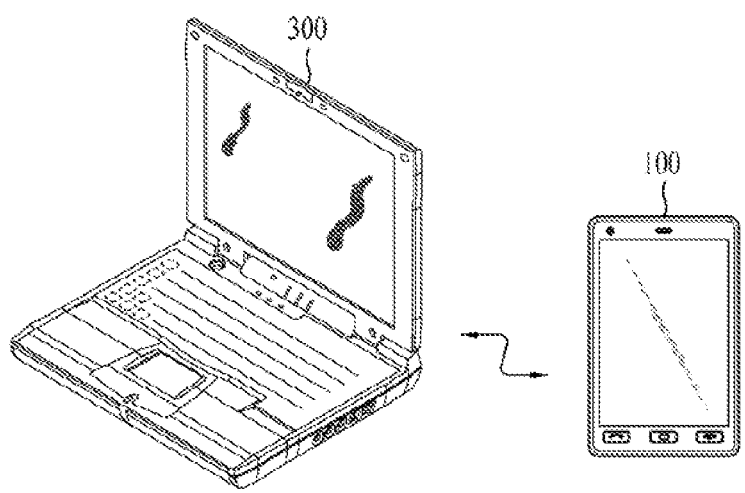
(22-1)
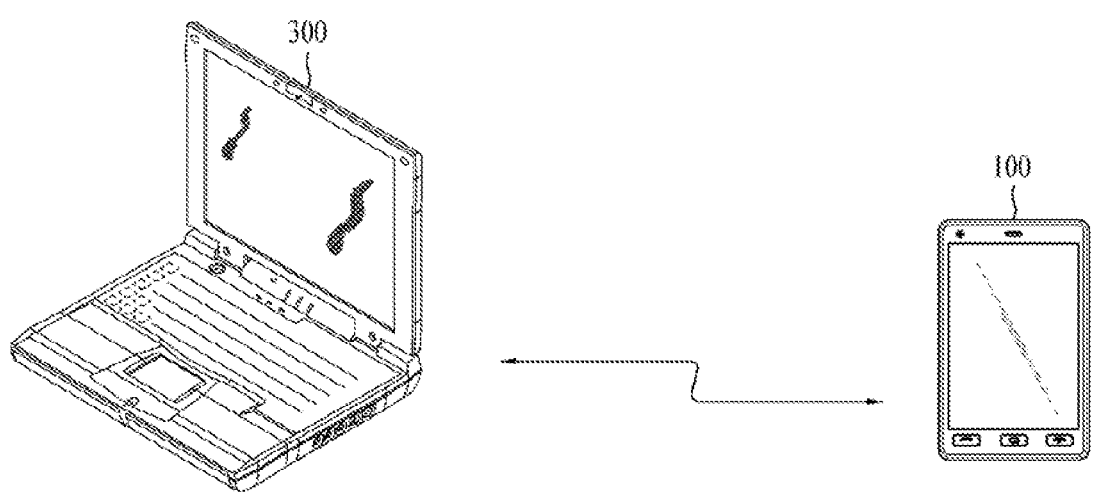
(22-2)

MOBILE TERMINAL AND CONTROLLING METHOD THEREOF

This application is a continuation of U.S. patent application Ser. No. 15/406,533, filed on Jan. 13, 2017, now U.S. Pat. No. 9,922,317, which is a continuation of U.S. patent application Ser. No. 13/605,777, filed on Sep. 6, 2012, now abandoned, which claims the benefit of earlier filing date and right of priority to Korean Application No. 10-2011-0090847, filed on Sep. 7, 2011 the contents of which are all hereby incorporated by reference herein in their entirety.

BACKGROUND OF THE INVENTION

Field of the Invention

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

Discussion of the Related Art

A mobile terminal is a device which may be configured to perform various functions. Examples of such functions include facilitating data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

Recently, many ongoing efforts are made to research and develop a method of instantly paying various expenses (e.g., transportation fee, restaurant bill for meals, grocery shopping expense, etc.) caused by a terminal user using a payment means provided to the mobile terminal.

In particular, at least one of a bank (or credit card) payment chip of a hardware type and a bank (or credit card) payment application of a software type may be loaded as the payment means on the mobile terminal. When the mobile terminal proximately approaches an external payment terminal, a short range communication may be performed between the payment means and the external payment terminal. In doing so, the external payment terminal receives bank account information (or credit card information) of a terminal user via the short range communication from the payment means storing the corresponding information and then performs a process for the payment of the expense supposed to be paid by the terminal user.

Yet, the payment means may raise the possibility of being copied and used by an unauthorized $3^{rd}$ party. To solve the problem of the unauthorized copy and use, it may be necessary to perform a procedure for authentication of a terminal user more strictly when the payment means is used.

However, according to a related art, the stricter the authentication procedure gets, the more complicated a user interface implemented for the authentication procedure in the mobile terminal becomes. And, the complicated user interface eventually causes inconvenience in using the mobile terminal. Hence, the ongoing discussion on a method of performing the authentication procedure strictly without causing the inconvenience in using the mobile terminal further needs to continue.

Moreover, when the payment is made via the mobile terminal, it may be necessary to further discuss on a method for facilitating a terminal user to select a bank account or a credit card.

SUMMARY OF THE INVENTION

Accordingly, the present invention is directed to a mobile terminal and controlling method thereof that substantially obviate one or more problems due to limitations and disadvantages of the related art.

Particular embodiments of the present invention are directed towards a mobile terminal and controlling method thereof, by which a strict authentication procedure for making payment can be performed via a simple and convenient user interface between the mobile terminal and a terminal user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a wireless communication unit configured to perform a short range communication with an external terminal, a touchscreen configured to sense a touch gesture, a sensing unit configured to sense a motion gesture of the mobile terminal, and a controller configured to control at least one gesture of a specific touch gesture via the touchscreen and a specific motion gesture via the sensing unit to be set previously, initiate the short range communication with the external terminal when the mobile terminal approaches close to the external terminal within a predetermined distance range, determine whether to continue the initiated short range communication with the external terminal in accordance with whether the previously set gesture is sensed again.

In another aspect of the present invention, a mobile terminal according to another embodiment of the present invention includes a wireless communication unit configured to perform a short range communication with an external terminal, a position location module configured to obtain a current location, a sensing unit configured to sense a motion gesture of the mobile terminal and an ambient light of the mobile terminal, and a controller configured to when the mobile terminal approaches close to an external short range communication tag within a predetermined distance range from the mobile terminal, performing one of automatically activating a different application, automatically changing a setting of a specific application, and automatically changing a setting of the mobile terminal in accordance with at least one of an alignment of the mobile terminal, the current location of the mobile terminal, a current time of the mobile terminal and the ambient light sensed by the mobile terminal.

In another aspect of the present invention, a method of controlling a mobile terminal according to another embodiment of the present invention includes controlling at least one gesture of a specific touch gesture via a touchscreen and a specific motion gesture via a sensing unit to be set previously, initiating a short range communication with an external terminal when the mobile terminal approaches close to the external terminal within a predetermined distance range, and determining whether to continue the initiated short range communication with the external terminal in accordance with whether the previously set gesture is sensed again.

In another aspect of the present invention, a method of controlling a mobile terminal according to another embodiment of the present invention includes when the mobile terminal approaches close to an external short range communication tag within a predetermined distance range from the mobile terminal, obtaining at least one terminal state among an alignment of the mobile terminal, a current location of the mobile terminal, a current time of the mobile terminal and an ambient light sensed by the mobile terminal; and performing one of automatically activating a different application, automatically changing a setting of a specific application, and automatically changing a setting of the mobile terminal in accordance with the obtained at least one terminal state.

In a further aspect of the present invention, an electronic recording medium according to a further embodiment of the present invention includes $1^{st}$ to $3^{rd}$ commands encoded therein to be executed in a mobile terminal, wherein the $1^{st}$ command is encoded to control at least one gesture of a specific touch gesture via a touchscreen and a specific motion gesture via a sensing unit to be set previously, wherein the $2^{nd}$ command is encoded to initiate a short range communication with an external terminal when the mobile terminal approaches close to the external terminal within a predetermined distance range, and wherein the $3^{rd}$ command is encoded to determine whether to continue the initiated short range communication with the external terminal in accordance with whether the previously set gesture is sensed again.

In another further aspect of the present invention, an electronic recording medium according to another further embodiment of the present invention includes $1^{st}$ and $2^{nd}$ commands encoded therein to be executed in a mobile terminal, wherein the $1^{st}$ command is encoded to obtain at least one terminal state among an alignment of the mobile terminal, a current location of the mobile terminal, a current time of the mobile terminal and an ambient light sensed by the mobile terminal when the mobile terminal approaches close to an external short range communication tag within a predetermined distance range from the mobile terminal and wherein the $2^{nd}$ command is encoded to perform one of automatically activating a different application, automatically changing a setting of a specific application, and automatically changing a setting of the mobile terminal in accordance with the obtained at least one terminal state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 4 is a diagram of a mobile terminal and an external payment terminal for expense payment according to the present invention;

FIGS. 10 to 21 are diagrams of display screen configurations to implement a method of controlling a mobile terminal according to another embodiment of the present invention; and FIG. 22 is a diagram for an environment of a short range communication between a mobile terminal and a peripheral communication device according to the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
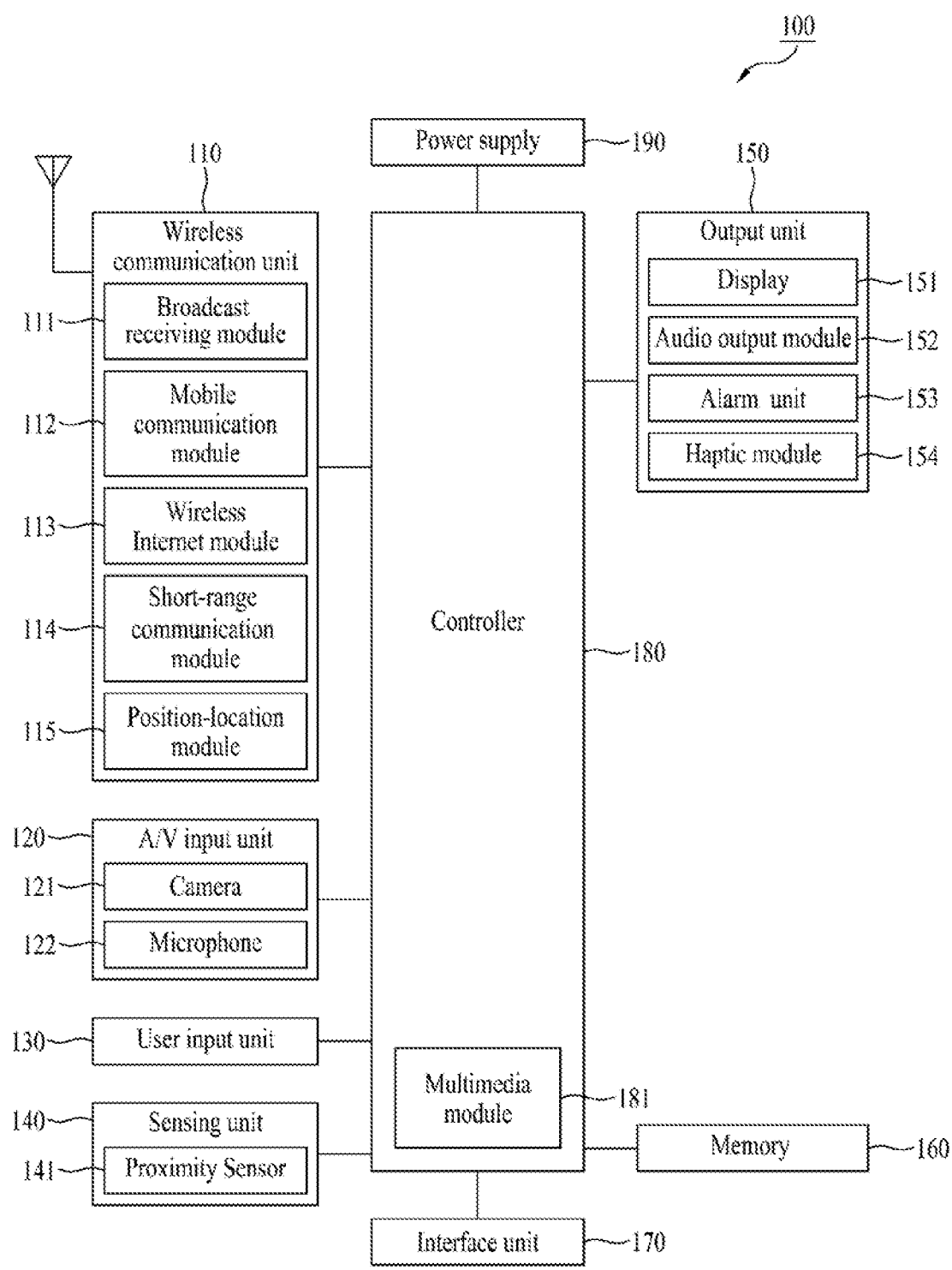
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video)

input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include NFC (Near Field Communication), radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time informations are then amended (or corrected) using another satellite. In addition, the GPS module 115 is able to calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect at least one of an ambient light around the mobile terminal 100, an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this case, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a Near Field Communication (NFC) Chip, a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

It is not mandatory for the identity module to be detachably attached to the mobile terminal via the interface unit 170. Alternatively, the identity module may be permanently built as a sort of the memory unit 160 in the mobile terminal 100.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. The multimedia module 181 may be implemented with a single module or at least two or more modules.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2A:
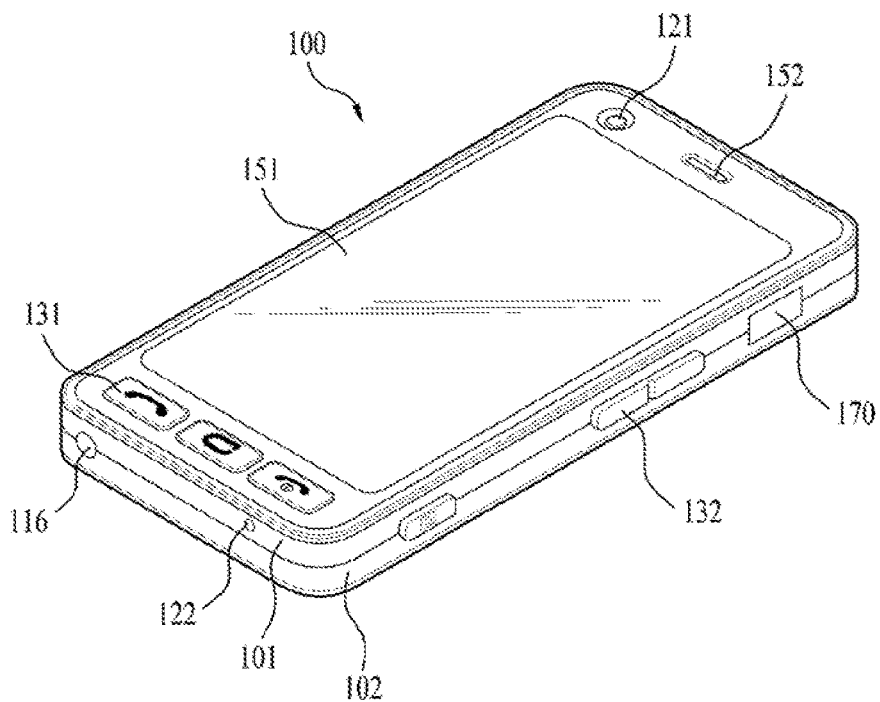
FIG. 2A is a front perspective view of a mobile terminal according to one embodiment of the present invention.

FIG. 2A is a front perspective view of a mobile terminal according to one embodiment of the present invention.

The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Figure 2B:
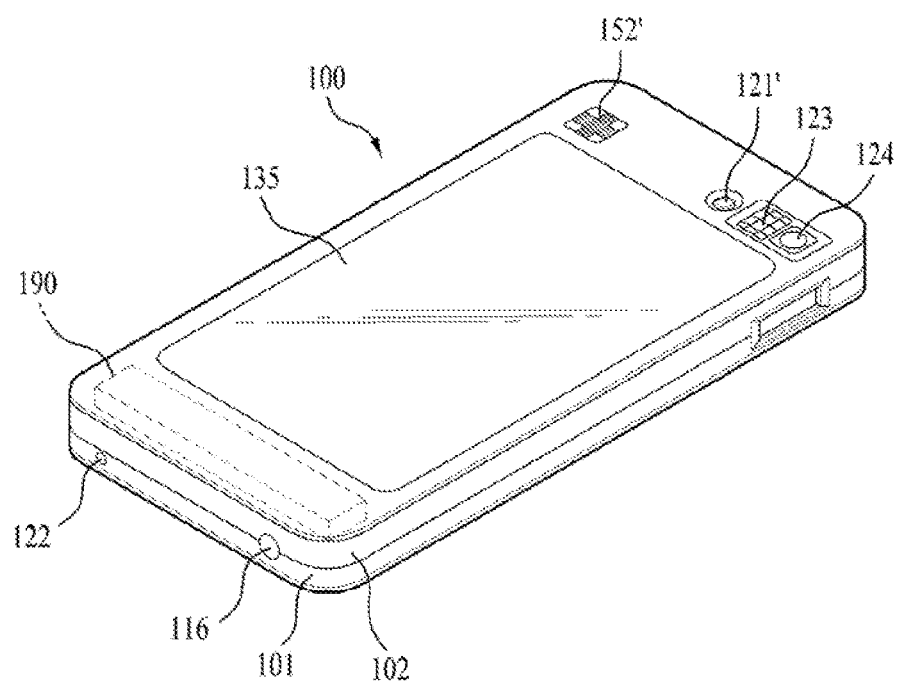
FIG. 2B is a rear perspective view of a mobile terminal according to one embodiment of the present invention.

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 (see FIG. 2A) and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph (e.g., a finer detail photograph) of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output module 152' can be provided at the rear of the terminal body. The additional audio output module 152' is for implementing a stereo function together with the audio output module 152 (see FIG. 2A) and may be used for implementation of a speakerphone mode when speaking over the terminal.

A broadcast signal receiving antenna 116 can be additionally provided at the lateral side of the terminal body as well as an antenna for communication. The broadcast signal receiving antenna may constitute a portion of the broadcast receiving module 111 (see FIG. 1) and be retractable into the terminal body.

A power supply unit 190 for supplying a power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmittive type similar to the display 151. In this case, if the display 151 is configured to output visual information from both of its faces, the visual information is viewable via the touchpad 135 as well. The information output from both of the faces can be entirely controlled by the touchpad 135.

Alternatively, a display is further provided for the touchpad 135 so that a touchscreen can be provided at the rear case 102 as well.

The touchpad 135 is activated by interconnecting with the display 151 of the front case 101. The touchpad 135 can be provided at the rear of the display 151 to extend parallel to the display 151. The touchpad 135 can have a size equal to or smaller than the size of the display 151.

In the disclosure presented herein, embodiments related to a method, which can be implemented in the mobile terminal 100, for controlling the mobile terminal are described with reference to the accompanying drawings.

If the display module 151 includes a touchscreen, implementation of the following embodiment is further facilitated. Therefore, the following description is made on the assumption that the display module 151 includes a touchscreen. And, a display screen of the touchscreen 151 shall be indicated by a reference number 400 in the following description.

Figure 3:
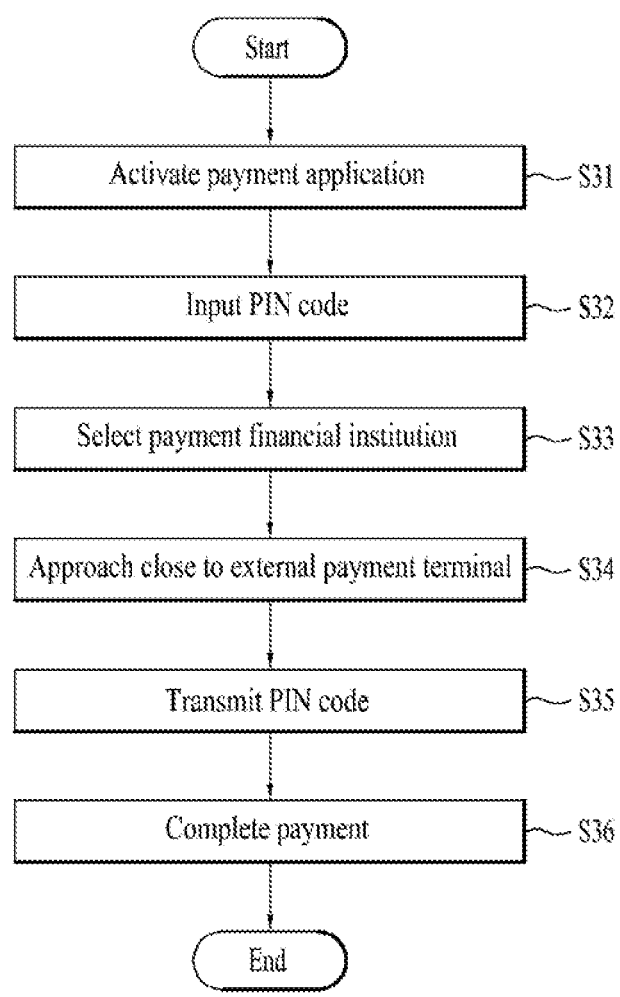
FIG. 3 is a flowchart for a method of controlling a mobile terminal according to one embodiment of the present invention.

FIG. 3 is a flowchart for a method of controlling a mobile terminal according to one embodiment of the present invention. FIG. 4 is a diagram of a mobile terminal and an external payment terminal for expense payment according to the present invention. And, FIG. 5 is a diagram of display screen configurations to implement a method of controlling a mobile terminal according to one embodiment of the present invention.

Referring to FIG. 4 (4-1), assume that the mobile terminal 100 is placed in a manner of being spaced apart from the external payment terminal 200 in a distance over a predetermined interval. And, the external payment terminal 200 is connected to a payment server (not shown in the drawing) by wire or wireless.

Figure 5:
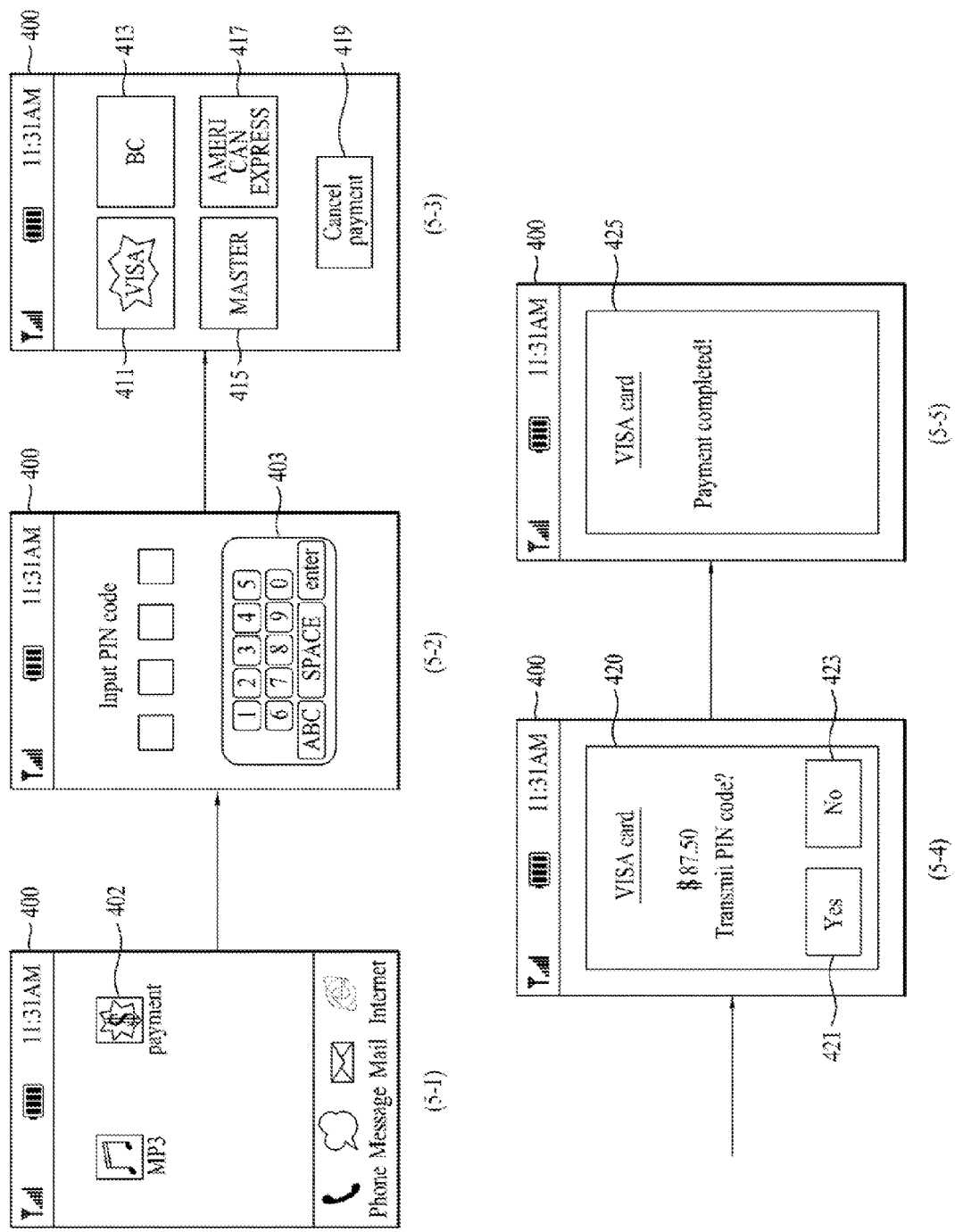
FIGS. 5 to 8 are diagrams of display screen configurations to implement a method of controlling a mobile terminal according to one embodiment of the present invention.

Referring to FIG. 5 (5-1), assume that a home screen is displayed on the touchscreen 400 while the mobile terminal 100 is in a home screen mode. For instance, when the mobile terminal 100 is in a locked mode, if the locked mode is canceled, the home screen mode can be entered. The locked mode and the cancellation of the locked mode shall be described later.

An expense payment icon 402 for activating an expense payment application (or program/software) may be displayed on the home screen. In this disclosure, the application may mean an execution program or software installed on the mobile terminal as a default or by a user.

If the expense payment icon 402 is touched by a terminal user, the controller 180 may control the expense payment application to be activated [S31].

Once the expense payment application is activated, referring to FIG. 5 (5-2), the controller 180 may control a password input screen, which is provided to input a password for the expense payment, to be displayed on the touchscreen 400. In the following description, assume that the password is a PIN (personal identification number) code, by which the present invention is non-limited. When the PIN code input screen is displayed, the controller 180 may control a software keypad 403, which is provided for the PIN code input, to be displayed on the touchscreen 400.

Subsequently, the terminal user may input a prescribed PIN code using the software keypad 403 [S32]. The controller 180 may be then able to control the inputted prescribed PIN code to be temporarily saved in the mobile terminal 100. In particular, the prescribed PIN code may include a PIN code previously registered with the payment server for the expense payment via the mobile terminal 100.

The inputted prescribed PIN code is temporarily saved to be automatically deleted after completion of one expense payment. Hence, the prescribed PIN code should be inputted each time an expense payment is made.

After the PIN code has been temporarily saved, referring to FIG. 5 (5-3), the controller 180 may control a financial institution list containing at least one financial institution to be displayed for the expense payment on the touchscreen 400. In particular, FIG. 5 (5-3) shows that credit card companies are listed on the financial institution list displayed on the touchscreen 400, by which the present embodiment may be non-limited. Alternatively, banks may be listed on the financial institution list displayed on the touchscreen 400. Alternatively, credit card companies and banks may be simultaneously listed on the financial institution list displayed on the touchscreen 400.

The terminal user may be able to touch and select a desired financial institution from the displayed financial institution list [S33]. In FIG. 5 (5-3), assume that 'VISA' is selected from the financial institution list. If the desired financial institution does not exist in the financial institution list for the expense payment, the terminal user may be able to stop the present expense payment procedure by touching and selecting a payment cancellation icon 419 displayed on the touchscreen 400.

Optionally, the PIN code inputting step S32 and the financial institution selecting step S33 may be switched to each other in order.

Once the desired financial institution is selected, referring to FIG. 4 (4-2), the terminal user may be able to move the mobile terminal 100 to approach the external payment terminal 200, to which an expense to be paid has been inputted, to be situated within the prescribed interval therefrom [S34].

If so, the mobile terminal 100 is able to establish a short range communication with the external payment terminal 200 for the expense payment by a preset short range communication system. In doing so, the established short range communication for the expense payment may include a near field communication (hereinafter abbreviated "NFC").

Once the short range communication is established, the mobile terminal 100 may be able to receive an amount of the expense to be paid from the external payment terminal 200.

The controller 180 may control a PIN code transmit screen 420 to be displayed on the touchscreen 400. In this case, the PIN code transmit screen 420 displays the selected financial institution and the amount of the expense to be paid and is provided to confirm whether the temporarily saved PIN code for the expense payment will be transmitted to the external payment terminal 200. The terminal user may touch and select an icon 'yes' 421 or an icon 'no' 423 displayed on the PIN code transmit screen 420 to determine whether to transmit the temporarily saved PIN code [S35].

If the PIN code is transmitted to the external payment terminal 200, the expense payment is completed. Referring to FIG. 5 (5-5), the controller 180 may control a payment completion screen 425 to be displayed on the touchscreen 400 to indicate that the expense payment has been completed [S36].

According to the above-described embodiment, since the inputted prescribed PIN code is temporarily saved to be automatically deleted after completion of one expense payment, the prescribed PIN code needs to be inputted for each expense payment, by which the embodiment of the present invention may be non-limited. Alternatively, for example, if the prescribed PIN code is inputted once to the mobile terminal, the inputted prescribed PIN code is non-temporarily saved. Hence, the saved PIN code may continue to be used for expense payments unless changed. This is described with reference to FIGS. 6 to 10 as follows.

First of all, a process for setting and saving a PIN code in the mobile terminal in advance is described as follows.

Figure 6:
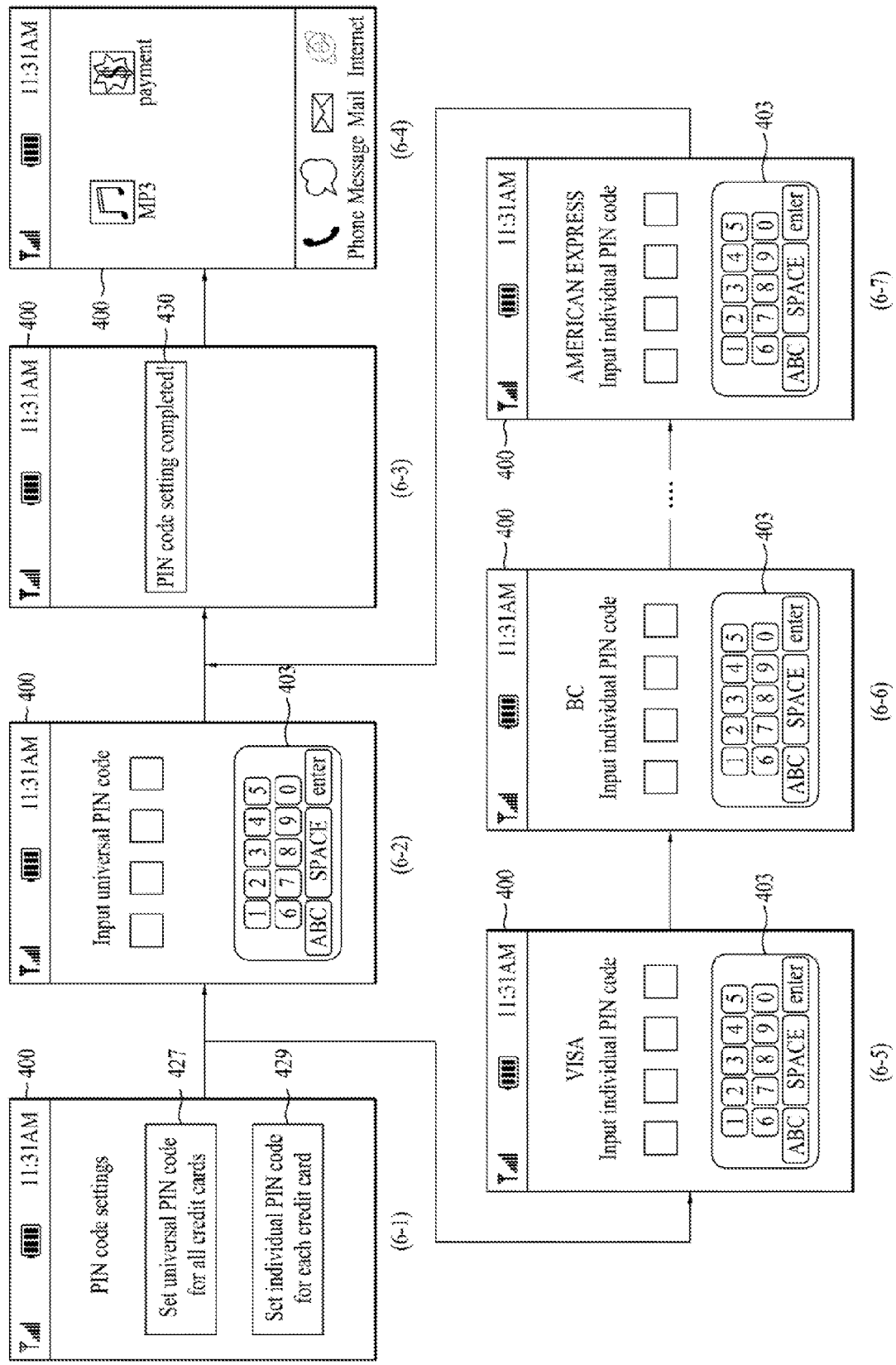

FIG. 6 is a diagram of display screen configurations to implement a method of controlling a mobile terminal according to one embodiment of the present invention.

Referring to FIG. 6 (6-1), after the mobile terminal 100 has entered a PIN code setting mode, assume that a screen for setting a PIN code is displayed on the touchscreen 400.

On the screen for the setting of the PIN code, a universal PIN code setting icon 427 for setting the same universal PIN code for all financial institutions contained in the financial institution list and an individual PIN code setting icon 429 for setting an individual PINC code for each of the financial institutions contained in the financial institution list may be displayed.

In case that the same universal PIN code for all financial institutions is previously registered with the payment server, the terminal user may touch and select the universal PIN code setting icon 427.

If so, referring to FIG. 6 (6-2), the controller 180 may be able to control a screen having a soft keypad 403 to be displayed on the touchscreen 400. In this case, the screen having the soft keypad 403 is provided to input the universal PIN code. The terminal user may be able to input the previously registered universal PIN code using the soft keypad 403.

If the universal PIN code in inputted, referring to FIG. 6 (6-3), the controller 180 may control an indication 430 to be displayed on the touchscreen 400. In this case, the indication 430 is provided to indicate that the PIN code setting has been completed.

After the indication 430 has been displayed, referring to FIG. 6 (6-4), the controller 180 may control the mobile terminal 100 to enter the home screen mode automatically within a prescribed time.

In case that a PIN code is individually and previously registered with the payment server for each of the financial institutions, the terminal user may be able to touch and select the individual PIN code setting icon 429.

If so, referring to FIG. 6 (6-5), the controller 180 may control a screen for inputting a $1^{st}$ PIN code for a $1^{st}$ financial institution 'VISA' contained in the financial institution list to be displayed. In particular, it is a matter of course that the soft keypad 403 can be displayed on the screen.

If the $1^{st}$ PIN code is inputted, referring to FIG. 6 (6-6) and FIG. 6 (6-7), the controller 180 may control screens for inputting $2^{nd}$ to $4^{th}$ PIN codes for the rest of the financial institutions (i.e., $2^{nd}$ financial institution 'BC' to $4^{th}$ financial institution 'AMERICAN EXPRESS') contained in the financial institution list to be sequentially displayed, respectively.

One of the universal PIN code and the $1^{st}$ to $4^{th}$ PIN codes may be equal to one of the rest of the PIN codes or may be different from the rest of the PIN codes.

If the $1^{st}$ to $4^{th}$ PIN codes are inputted, referring to FIG. 6 (6-3), the controller 180 may control the indication 430 about the completion of the PIN code settings to be displayed on the touchscreen 400.

In the following description, a motion gesture for granting the set PIN code to be transmitted from the mobile terminal to the external payment terminal is explained in detail with reference to FIG. 7.

Figure 7:
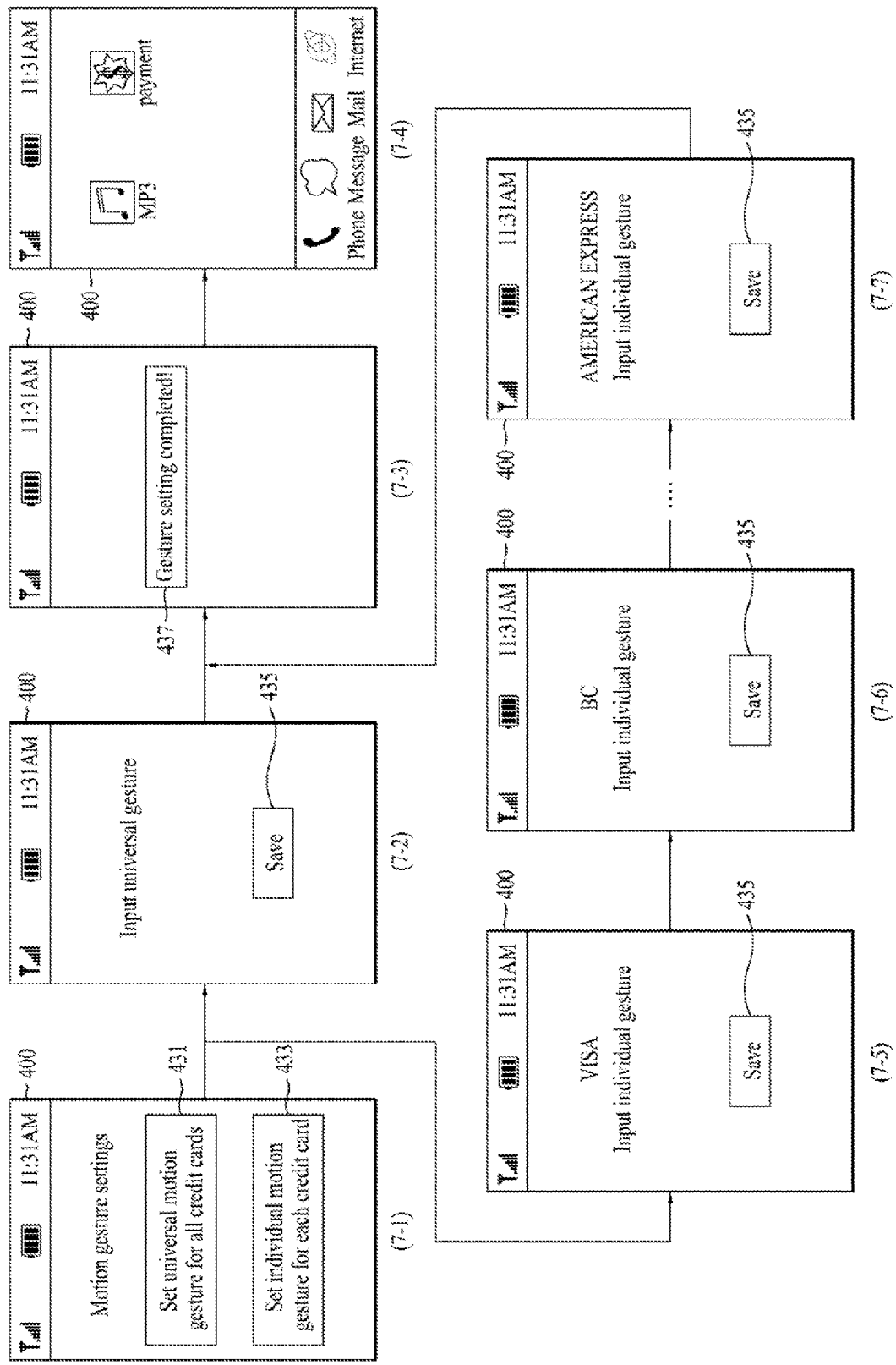

FIG. 7 is a diagram of display screen configurations to implement a method of controlling a mobile terminal according to one embodiment of the present invention.

Referring to FIG. 7, the motion gesture may mean the gesture performed by a terminal user to move the mobile terminal intentionally in a space in order to achieve at least one of aligning the mobile terminal in specific direction, moving the mobile terminal in specific direction and moving the mobile terminal along a specific track. And, the motion gesture may be detected by the sensing unit 140 and the detected motion gesture may be then delivered to the controller 180.

How to set the motion gesture in the mobile terminal is described in detail as follows.

Referring to FIG. 7 (7-1), after the mobile terminal 100 has entered a motion gesture setting mode, assume that a screen for setting the motion gesture is displayed on the touchscreen 400.

On the screen for setting the motion gesture, a universal motion gesture setting icon 431 for setting a same universal motion gesture for all financial institutions contained in the finance institution list and an individual motion gesture setting icon 433 for setting an individual motion gesture for each of the financial institutions contained in the financial institution list may be displayed.

First of all, a case for a terminal user to touch and select the universal motion gesture setting icon 431 is described as follows.

If so, referring to FIG. 7 (7-2), the controller 180 may control a screen for inputting a desired universal motion gesture to be displayed on the touchscreen 400. In this case, the terminal user performs the desired universal motion gesture by moving the mobile terminal 100 in a space and may then touch to select a save icon 435. The desired universal motion can be arbitrarily assigned by the user as he/she likes. If so, the controller 180 controls the universal motion gesture sensed by the sensing unit 140 to be saved.

Once the universal motion gesture is saved, referring to FIG. 7 (7-3), the controller 180 may control an indication 437 to be displayed on the touchscreen 400 to indicate that the motion gesture setting has been completed.

After the indication 437 has been displayed, referring to FIG. 7 (7-4), the controller 180 may control the mobile terminal 100 to automatically enter the home screen mode within prescribed duration.

A case for the terminal user to touch and select the individual motion gesture setting icon 433 is described as follows.

First of all, if the individual motion gesture setting icon 433 is selected, referring to FIG. 7 (7-5), the controller 180 may control a screen for saving a $1^{st}$ individual motion gesture for a $1^{st}$ financial institution 'VISA' contained in the financial institution list to be displayed. In doing so, the terminal used performs a desired $1^{st}$ individual motion gesture by moving the mobile terminal 100 in a space and may be then able to touch and select a save icon 435. The desired $1^{st}$ individual motion can be arbitrarily assigned by the user as he/she likes. If so, the controller 180 controls the $1^{st}$ individual motion gesture sensed by the sensing unit 140 to be saved.

If the $1^{st}$ individual motion gesture is saved, referring to FIG. 7 (7-6) and FIG. 7 (7-7), the controller 180 may control screens for saving $2^{nd}$ to $4^{th}$ individual motion gestures for the rest of the financial institutions (i.e., $2^{nd}$ financial institution 'BC' to $4^{th}$ financial institution 'AMERICAN EXPRESS') contained in the financial institution list to be sequentially displayed, respectively.

If the $1^{st}$ to $4^{th}$ individual motion gestures are saved, referring to FIG. 7 (7-3), the controller 180 may control the indication 437 about the completion of the motion gesture settings to be displayed on the touchscreen 400.

One of the universal motion gesture and the $1^{st}$ to $4^{th}$ individual motion gestures may be equal to one of the rest of the motion gestures or may be different from the rest of the motion gestures.

According to the embodiment of the present invention, it is not mandatory for the set PIN code to be accepted via the motion gesture only. For instance, the set PIN code may be accepted via a touch gesture performed on the touchscreen 400.

In the following description, a touch gesture for granting the set PIN code to be transmitted to the external payment terminal from the mobile terminal is explained in detail with reference to FIG. 8.

Figure 8:
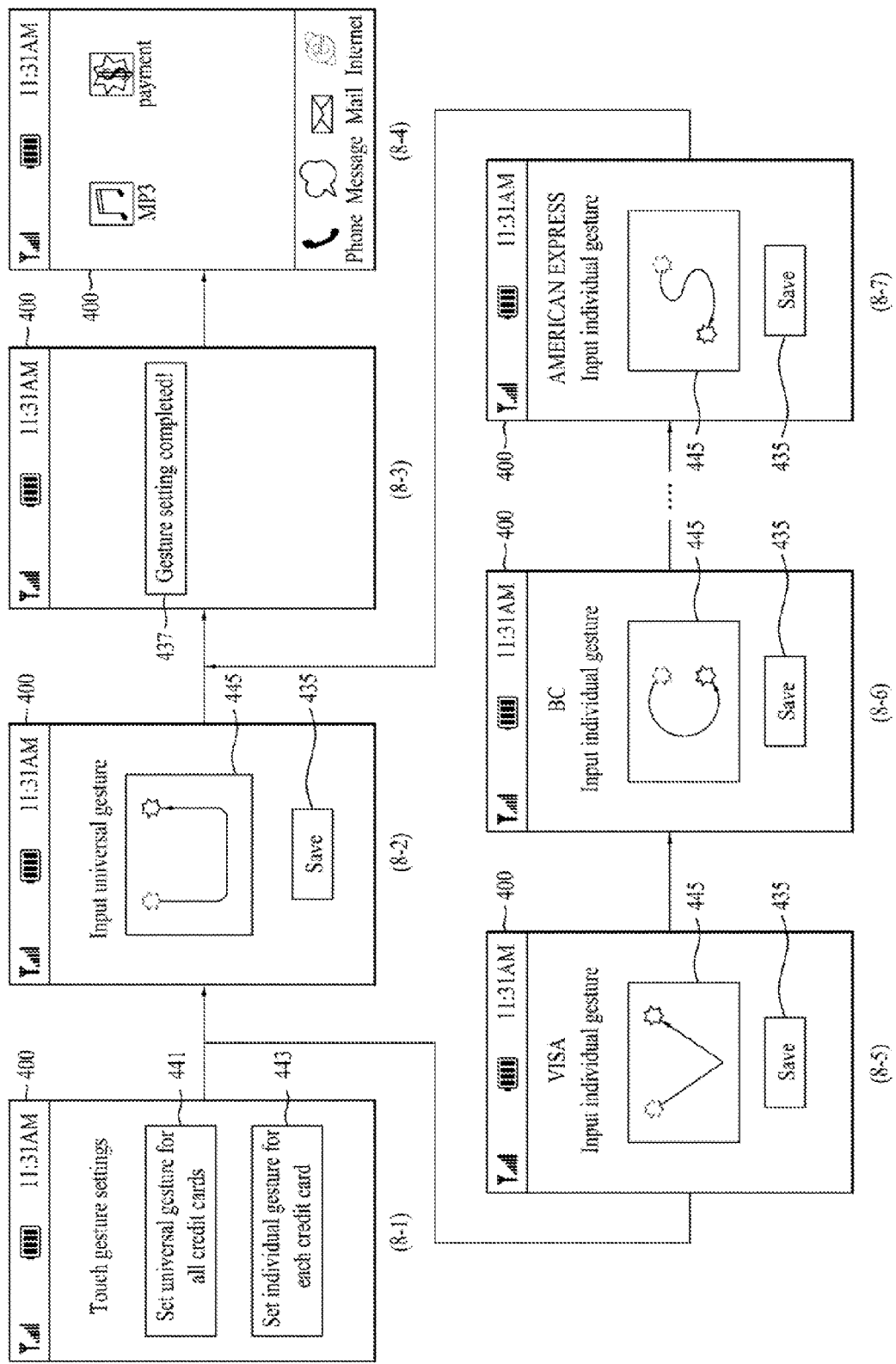

FIG. 8 is a diagram of display screen configurations to implement a method of controlling a mobile terminal according to one embodiment of the present invention.

Referring to FIG. 8, the motion gesture may mean one of a simple touch to the touchscreen, a long touch to the touchscreen, a multi-touch (e.g., a double touch, a triple touch, etc.) to the touchscreen, a touch flick or drag on the touchscreen in specific direction, and a touch drag on the touchscreen according to a specific track.

A process for setting the touch gesture in the mobile terminal is described in detail as follows.

Referring to FIG. 8 (8-1), after the mobile terminal 100 has entered a touch gesture setting mode, assume that a screen for setting the touch gesture is displayed on the touchscreen 400.

On the screen for setting the touch gesture, a universal touch gesture setting icon 441 for setting a same universal touch gesture for all financial institutions contained in the finance institution list and an individual touch gesture setting icon 443 for setting an individual touch gesture for each of the financial institutions contained in the financial institution list may be displayed.

First of all, a case for a terminal user to touch and select the universal touch gesture setting icon 441 is described as follows.

If so, referring to FIG. 8 (8-2), the controller 180 may control a screen for inputting a desired universal touch gesture to be displayed on the touchscreen 400. In this case, the terminal user performs the desired universal touch gesture on the touchscreen 400 and may then touch to select a save icon 435. The desired universal touch gesture can be arbitrarily assigned by the user as he/she likes. If so, the controller 180 controls the universal touch gesture performed on the touchscreen 400 to be saved.

Once the universal touch gesture is saved, referring to FIG. 8 (8-3), the controller 180 may control an indication 437 to be displayed on the touchscreen 400 to indicate that the touch gesture setting has been completed.

After the indication 437 has been displayed, referring to FIG. 8 (8-4), the controller 180 may control the mobile terminal 100 to automatically enter the home screen mode within prescribed duration.

A case for the terminal user to touch and select the individual touch gesture setting icon 443 is described as follows.

First of all, if the individual touch gesture setting icon 443 is selected, referring to FIG. 7 (7-5), the controller 180 may control a screen for saving a $1^{st}$ individual touch gesture for a $1^{st}$ financial institution 'VISA' contained in the financial institution list to be displayed. In doing so, the terminal used performs a desired $1^{st}$ individual touch gesture on the touchscreen 400 and may be then able to touch and select the save icon 435. The desired $1^{st}$ individual touch gesture can be arbitrarily assigned by the user as he/she likes. If so, the controller 180 controls the $1^{st}$ individual touch gesture performed on the touchscreen 400 to be saved.

If the $1^{st}$ individual touch gesture is saved, referring to FIG. 8 (8-6) and FIG. 8 (8-7), the controller 180 may control screens for saving $2^{nd}$ to $4^{th}$ individual touch gestures for the rest of the financial institutions (i.e., $2^{nd}$ financial institution 'BC' to $4^{th}$ financial institution 'AMERICAN EXPRESS') contained in the financial institution list to be sequentially displayed, respectively.

If the $1^{st}$ to $4^{th}$ individual touch gestures are saved, referring to FIG. 8 (8-3), the controller 180 may control the indication 437 about the completion of the touch gesture settings to be displayed on the touchscreen 400.

One of the universal touch gesture and the $1^{st}$ to $4^{th}$ individual touch gestures may be equal to one of the rest of the touch gestures or may be different from the rest of the touch gestures.

With respect to the acceptance of the set PIN code, one or both of the motion gesture and the touch gesture may be necessary.

In the following description, a method for a terminal user to transmit the set PIN code to the external payment terminal from the mobile terminal using the motion gesture or the touch gesture is explained with reference to FIG. 9 and FIG. 10.

Figure 9:
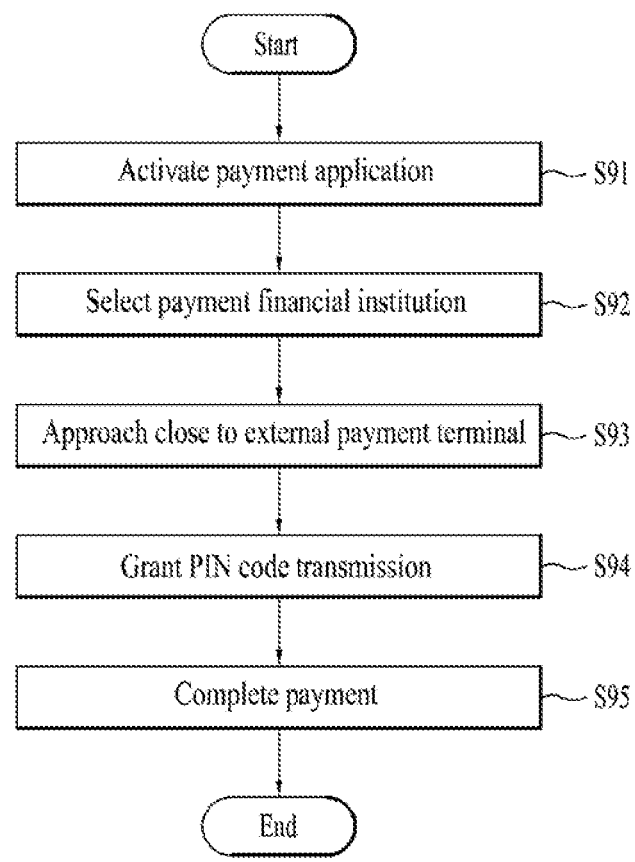
FIG. 9 is a flowchart for a method of controlling a mobile terminal according to another embodiment of the present invention.

FIG. 9 is a flowchart for a method of controlling a mobile terminal according to another embodiment of the present invention. And, FIG. 10 is a diagram of display screen configurations to implement a method of controlling a mobile terminal according to another embodiment of the present invention.

As mentioned in the foregoing description, assume that the mobile terminal 100 is placed in a manner of being spaced apart from the external payment terminal 200 in a distance over a predetermined interval and that the external payment terminal 200 is connected to a payment server (not shown in the drawing) by wire or wireless.

Figure 10:
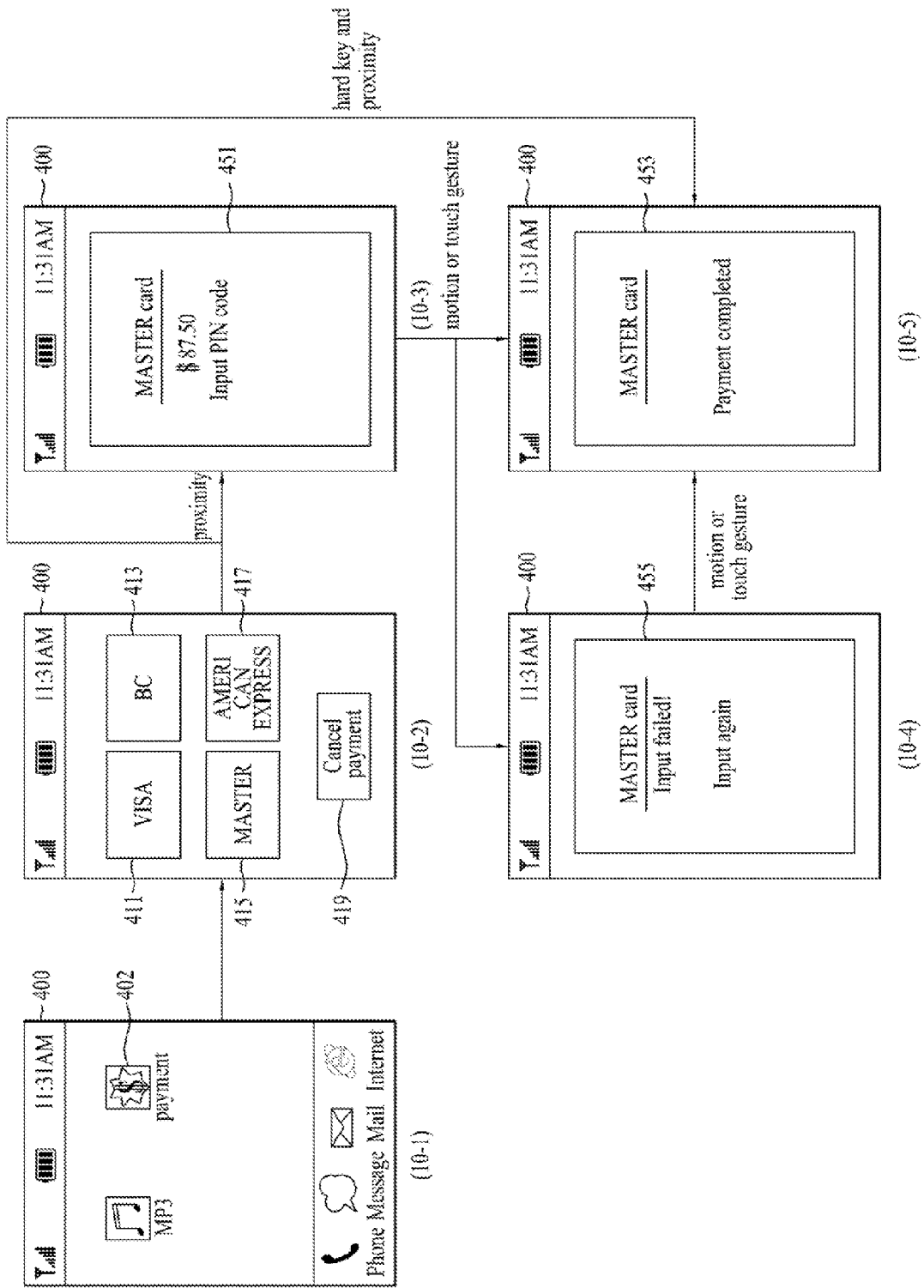

Referring to FIG. 10 (10-1), assume that a home screen is displayed on the touchscreen 400 while the mobile terminal 100 is in a home screen mode. As mentioned in the foregoing description, the expense payment icon 402 may be displayed on the home screen.

When the expense payment icon 402 is touched by a terminal user, the controller 180 may control the expense payment application to be activated [S91].

If the expense payment application is activated, referring to FIG. 10 (10-2), the controller 180 may control the financial institution list to be displayed on the touchscreen 400. As the process for displaying the financial institution is already mentioned in the foregoing description, its details shall be omitted from the following description.

The terminal user may be able to touch and select a desired financial institution from the displayed financial institution list [S92].

If the desired financial institution is selected, the terminal user may move the mobile terminal 100 to approach the external payment terminal 200, to which an expense to be paid is inputted, within the prescribed interval [S93].

If so, the mobile terminal 100 may be able to establish a short range communication for the expense payment with the external payment terminal 200 by a previously set short range communication system.

Once the short range communication is established, the mobile terminal 100 may be able to receive an amount of the expense to be paid from the external payment terminal 200.

Referring to FIG. 10 (10-3), the controller 180 may be able to control a PIN code transmit grant screen 451, which is provided for displaying the selected financial institution and the amount of the expense to be paid and granting the previously set PIN code to be transmitted to the external payment terminal 200 in association with the selected financial institution for the expense payment, to be displayed on the touchscreen 400. If it is unnecessary to check the expense as the expense to be paid is a constant or fixed amount (e.g., subway fee, etc.), the reception of the amount of the expense to be paid and the display of the amount of the expense may be omitted.

The terminal user may be able to perform a gesture (e.g., motion gesture, touch gesture, etc.) for the transmission grant of the same PIN code previously set in association with the selected financial institution [S94]. If both a motion gesture and a touch gesture are previously set for the PIN code transmit grant, any one of the motion gesture and the touch gesture may be performed without restrictions.

As mentioned in the foregoing description, since the expense to be paid is a constant or fixed amount (e.g., subway fee, etc.), if it is unnecessary to check the expense, the gesture for the PIN code transmit grant can be performed before or as soon as the mobile terminal approaches the external payment terminal proximately.

The controller 180 determines whether the gesture sensed by the sensing unit 140 is identical to the previously set gesture.

As a result of the determination, if the sensed gesture and the previously set gesture are identical to each other, the controller 180 may be able to control the previously set (universal or individual) PIN code corresponding to the selected financial institution to be transmitted to the external payment terminal 200. As the PIN code is transmitted to the external payment terminal 200, if the expense payment is completed, referring to FIG. 10 (10-5), the controller 180 may control a payment completion screen 453, which indicates that the expense payment has been completed, to be displayed on the touchscreen 400 [S95].

On the contrary, as a result of the determination, if the sensed gesture and the previously set gesture are not identical to each other, referring to FIG. 10 (10-4), the controller 180 may control a screen 455, which is provided to indicate that error exists in the PIN code transmit grant and to make a request for granting the PIN code transmission again, to be displayed on the touchscreen 400.

Meanwhile, according to the present embodiment, it may not be mandatory for one of the motion gesture and the touch gesture to be performed for the PIN code transmission.

For instance, after the desired financial institution has been selected from the displayed financial institution, the terminal user enables the mobile terminal 100 to approach the external payment terminal 200 within the prescribed interval in-between while pressing the preset hard key (e.g., the manipulation unit 131 or 132) (or within a prescribed time after pressing the hard key, which is applicable to the following). The reason why the hard key is pressed is to prevent the terminal user from unintentionally making the expense payment by moving the mobile terminal close to the external payment terminal unconsciously irrespective of user's intention. If the possibility of making the expense payment unintentionally is low, the terminal user may move the mobile terminal close to the external payment terminal 200 without pressing the hard key.

If so, the controller 180 does not wait for inputting the motion gesture or the touch gesture but may control the previously set PIN code to be directly transmitted to the external payment terminal 200. This is advantageous in quickly making the expense payment if it is unnecessary to check the expense to be paid, which is a constant or fixed amount (e.g., subway fee, etc.).

According to the above description, the desired financial institution is touched and selected from the financial institution list displayed on the touchscreen 400, by which the embodiment of the present invention may be non-limited. For instance, the desired financial institution may be selected using the motion gesture of the mobile terminal. This is described in detail with reference to FIG. 11 as follows.

Figure 11:
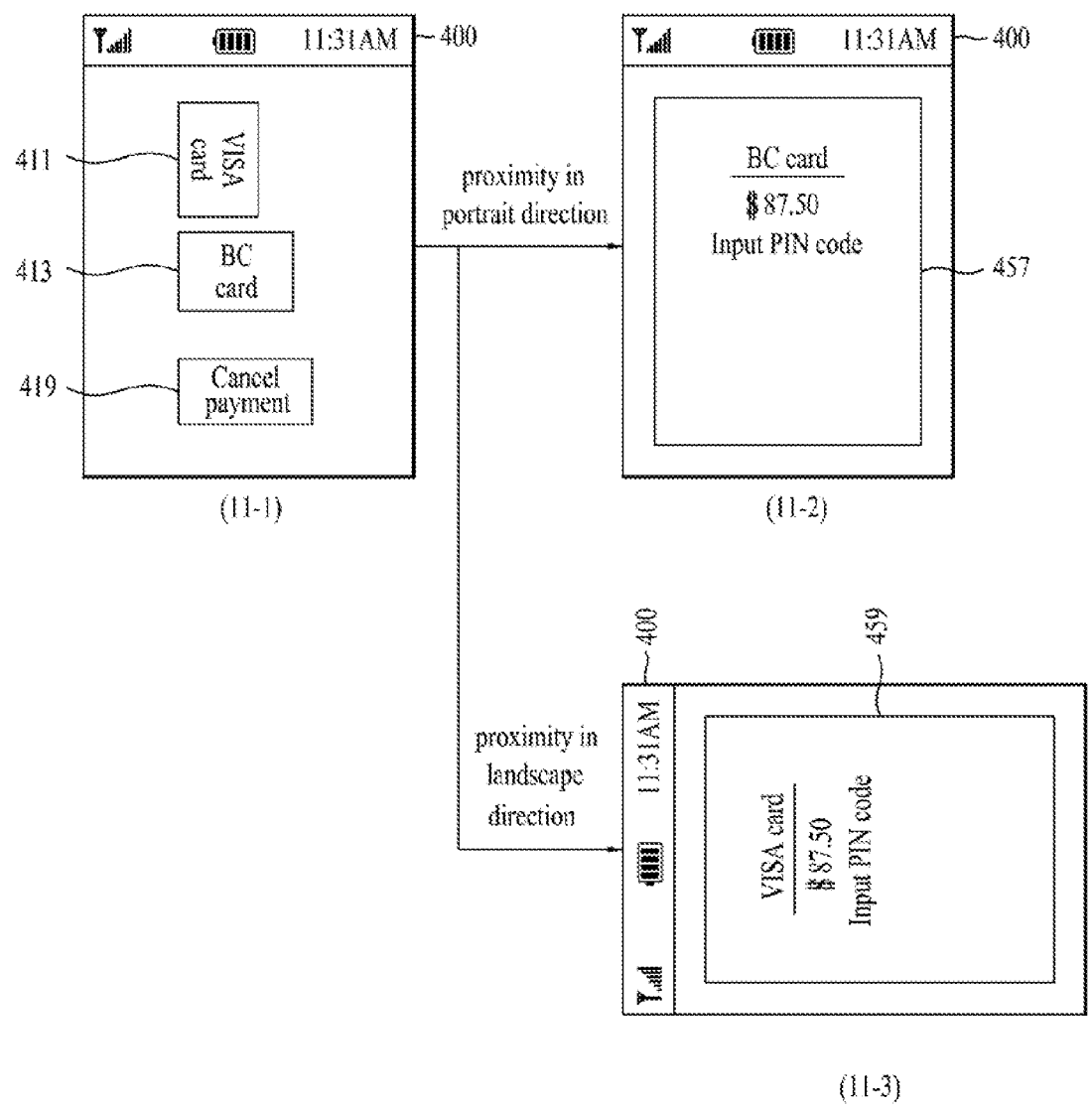

FIG. 11 is a diagram of display screen configurations to implement a method of controlling a mobile terminal according to another embodiment of the present invention.

Referring to FIG. 11 (11-1), the financial institution list may be displayed on the touchscreen 400.

When the mobile terminal 100 is aligned in portrait direction, the $2^{nd}$ financial institution (BC card) 413 in the financial institution list may be read in correct direction by a terminal user. Hence, the terminal user may be able to move the mobile terminal 100 close to the external payment terminal 200 by aligning the mobile terminal 100 in portrait direction.

If so, the mobile terminal 100 may be able to establish a short range communication for the expense payment with the external payment terminal by the previously set short range communication system.

In consideration of the aligned direction of the mobile terminal in the portrait direction sensed by the sensing unit 140, referring to FIG. 11 (11-2), the controller 180 may control a PIN code transmit grant screen 457, which is provided for granting the expense payment via the $2^{nd}$ financial institution, to be displayed.

On the other hand, when the mobile terminal 100 is aligned in landscape direction, the $1^{st}$ financial institution (VISA card) 411 in the financial institution list may be read in correct direction by a terminal user. Hence, the terminal user may be able to move the mobile terminal 100 close to the external payment terminal 200 by aligning the mobile terminal 100 in landscape direction.

If so, the mobile terminal 100 may be able to establish a short range communication for the expense payment with the external payment terminal by the previously set short range communication system.

In consideration of the aligned direction of the mobile terminal in the landscape direction sensed by the sensing unit 140, referring to FIG. 11 (11-3), the controller 180 may control a PIN code transmit grant screen 459, which is provided for granting the expense payment via the $1^{st}$ financial institution, to be displayed.

The PIN code transmission in the PIN code transmit grant screen is already mentioned in the foregoing description and its details shall be omitted from the following description.

According to the above description, one of the $1^{st}$ financial institution and the $2^{nd}$ financial institution is selected for the expense payment in accordance with whether the aligned direction of the mobile terminal 100 is the portrait direction or the landscape direction, by which the embodiment of the present invention may be non-limited. For instance, in accordance with whether the aligned direction of the mobile terminal 100 is a top-up portrait direction, a top-down portrait direction, a top-left landscape direction or a top-right landscape direction, one of the $1^{st}$ to $4^{th}$ financial institutions may be configured to be selected for the expense payment.

Meanwhile, if a terminal user is accustomed to the expense payment according to the procedure shown in FIG. 11, the corresponding terminal user may be able to select a desired financial institution from the financial institution list in accordance with the aligned direction of the mobile terminal without referring to the financial institution list. This is described in detail with reference to FIG. 12 as follows.

FIG. 12 is a diagram of display screen configurations to implement a method of controlling a mobile terminal according to another embodiment of the present invention.

Referring to FIG. 12 (12-1), while the mobile terminal 100 is in a home screen mode, assume that a home screen is displayed on the touchscreen 400. Alternatively, the mobile terminal 100 may be in the locked mode or the touchscreen-off mode.

In doing so, a terminal user moves the mobile terminal 100 close to the external payment terminal 200 by aligning the mobile terminal 100 in portrait direction while pressing the hard key. As mentioned in the foregoing description, the reason why the hard key is pressed is to prevent the terminal user from unintentionally making the expense payment by moving the mobile terminal close to the external payment terminal unconsciously irrespective of user's intention. If the possibility of making the expense payment unintentionally is low, the terminal user may move the mobile terminal close to the external payment terminal 200 by aligning the mobile terminal 100 in the portrait direction without pressing the hard key.

If so, the controller 180 activates the expense payment application and may control the mobile terminal 100 to establish a short range communication for the expense payment with the external payment terminal 200 by a previously set short range communication system.

In consideration of the aligned direction of the mobile terminal 100 in the portrait direction sensed by the sensing unit 140, referring to FIG. 12 (12-2), the controller 180 may control a PIN code transmit grant screen 457, which is provided for granting the expense payment via the $2^{nd}$ financial institution, to be displayed on the touchscreen 400.

On the other hand, a terminal user moves the mobile terminal 100 close to the external payment terminal 200 by aligning the mobile terminal 100 in landscape direction while pressing the hard key. As mentioned in the foregoing description, the action of pressing the hard key may be omitted.

If so, the controller 180 activates the expense payment application and may control the mobile terminal 100 to establish a short range communication for the expense payment with the external payment terminal 200 by a previously set short range communication system.

In consideration of the aligned direction of the mobile terminal 100 in the landscape direction sensed by the sensing unit 140, referring to FIG. 12 (12-3), the controller 180 may control a PIN code transmit grant screen 459, which is provided for granting the expense payment via the $1^{st}$ financial institution, to be displayed on the touchscreen 400.

The PIN code transmission in the PIN code transmit grant screen is already mentioned in the foregoing description and its details shall be omitted from the following description.

According to the above description, the step of selecting the desired financial institution for the expense payment and the PIN code transmission granting step are performed as separate procedures in a manner of being discriminated from each other, by which the present embodiment may be non-limited. For instance, the desired financial institution selecting step and the PIN code transmission granting step may be performed as a single procedure in a manner of merging together. This is described inn detail with reference to FIG. 13 as follows.

Figure 13:
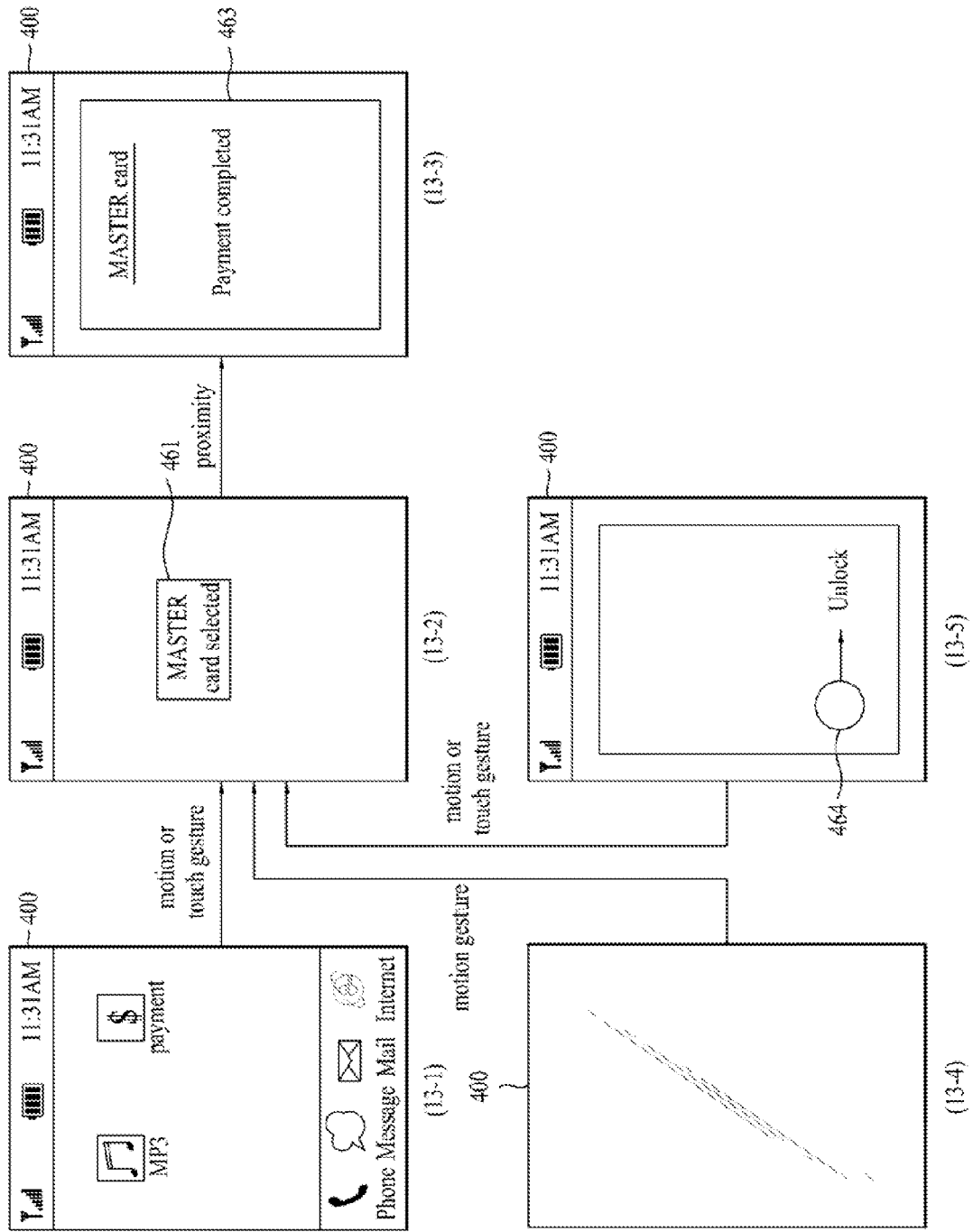

FIG. 13 is a diagram of display screen configurations to implement a method of controlling a mobile terminal according to another embodiment of the present invention.

Referring to FIG. 13 (13-1), while the mobile terminal 100 is in a home screen mode, assume that a home screen is displayed on the touchscreen 400.

In dong so, as mentioned in the foregoing description with reference to FIG. 7 or FIG. 8, a previously set individual gesture (e.g., a motion gesture, a touch gesture, etc.) may be performed for a desired financial institution. In particular, the touch gesture may be performed on the touchscreen 400 on which the home screen image is displayed. Moreover, in order to prevent an unintentional expense payment, the gesture (e.g., the motion gesture, the touch gesture, etc.) may be performed together with an action of pressing the hard key.

The above individual gesture may be performed to perform both of the selection of the desired financial institution and the PIN code transmit grant related to the selected financial institution simultaneously.

If so, referring to FIG. 13 (13-2), the controller 180 may control an indication 461, which indicates the desired financial institution corresponding to the gesture has been selected, to be displayed while activating the expense payment application in response to the gesture.

If so, the terminal user moves the mobile terminal 100 close to the external payment terminal 200. Hence, the mobile terminal 100 may be able to establish a short range communication with the external payment terminal 200 for the expense payment by a previously set short range communication system.

Thereafter, the controller 180 determines whether the short range communication is established within a prescribed time after performing the individual gesture.

If the short range communication is established within the prescribed time, since the PIN code transmission is already granted via the individual gesture, referring to FIG. 13 (13-3), the controller 180 may control the expense payment to be completed without a separate user command after the establishment of the short range communication by transmitting information on the selected financial institution and the corresponding PIN code to the external payment terminal 200.

On the contrary, if the short range communication is not established until the expiration of the prescribed time, the controller 180 stops activating the expense payment application and may control the mobile terminal 100 to go back to the home screen mode.

When the desired financial institution selecting step and the PIN code transmit granting step are performed, they may not be performed as one procedure by merging together only if the mobile terminal is in the home screen mode.

For instance, referring to FIG. 13 (13-4), when the mobile terminal 100 is in the touchscreen-off mode, an individual motion gesture corresponding to the desired financial institution may be performed. In order to prevent unintentional expense payment, the motion gesture may be performed while the hard key is pressed.

For another instance, referring to FIG. 13 (13-5), when the mobile terminal 100 is in the locked mode, an individual motion or touch gesture corresponding to the desired financial institution may be performed. In order to prevent unintentional expense payment, the corresponding gesture may be performed while the hard key is pressed.

If so, referring to FIG. 13 (13-2), the controller 180 activates the expense payment application in response to the gesture and may also control an indication 461, which indicates that the desired financial institution has been selected, to be displayed.

Thereafter, referring to FIG. 13 (13-3), the expense payment is completed. This is mentioned in the foregoing description and its details shall be omitted from the following description.

Meanwhile, regarding the description with reference to FIG. 13 (13-2), it may not be mandatory for the indication 461, which indicates that the desired financial institution has been selected, to be displayed. For instance, if the individual gesture and the proximity of the mobile terminal are performed almost simultaneously, the controller 180 may control the screen displayed on the touchscreen 400 to be directly switched in a manner of switching the screen shown in FIG. 13 (13-1) to the screen shown in FIG. 13 (13-3), switching the screen shown in FIG. 13 (13-4) to the screen shown in FIG. 13 (13-3), or switching the screen shown in FIG. 13 (13-5) to the screen shown in FIG. 13 (13-3).

Meanwhile, the selection of the financial institution may be configured to be performed when the mobile terminal is in the locked mode. This is described in detail with reference to FIG. 14 as follows.

Figure 14:
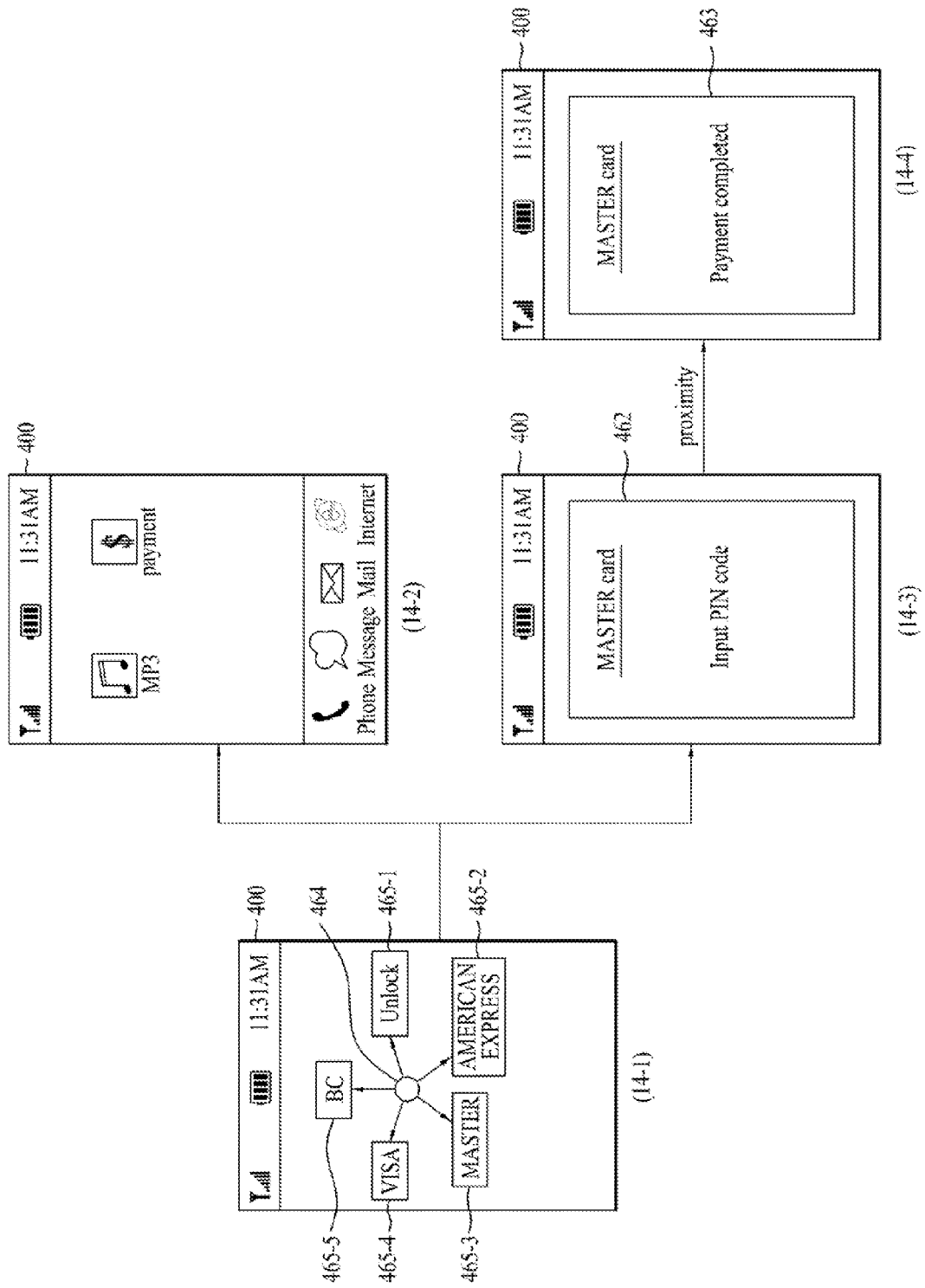

FIG. 14 is a diagram of display screen configurations to implement a method of controlling a mobile terminal according to another embodiment of the present invention.

Referring to FIG. 14, assume that the mobile terminal 100 is in the locked mode.

If so, referring to FIG. 14 (14-1), the controller 180 may control a lock screen to be displayed on the touchscreen 400.

On the lock screen, an unlock icon 464 and at least two or more drag direction indicators 465-1 to 465-5 for the unlock icon 464.

A terminal user may touch and drag the unlock icon 464 toward the 1$^{st}$ drag direction indicator 465-1 for the unlocking only.

If so, referring to FIG. 14 (14-2), in response to the touch drag toward the 1$^{st}$ drag direction indicator 465-1, the controller 180 may control the mobile terminal 100 to enter the home screen mode by canceling the locked mode.

Meanwhile, the terminal user may touch and drag the unlock icon 464 toward the 2$^{nd}$ drag direction indicator 465-3 for the unlocking and the selection of a desired financial institution (e.g., MASTER card).

If so, referring to FIG. 14 (14-3), in response to the touch drag toward the 2$^{nd}$ drag direction indicator 465-3, the controller 180 controls the mobile terminal 100 to be released from the locked mode, controls the expense payment application to be activated, and controls a PIN code transmit grant screen 461 for making the expense payment via the desired financial institution corresponding to the 2$^{nd}$ drag direction indicator 465-3 to be displayed on the touchscreen 400.

After the PIN code transmission has been granted, when the mobile terminal 100 is moved close to the external payment terminal 200, referring to FIG. 14 (14-4), the expense payment can be completed. This is already mentioned in the foregoing description and its details shall be omitted from the following description for clarity of this specification.

As mentioned in the foregoing description, when the expense payment is made using the mobile terminal 100, a lump-sum payment may be unnecessary. In particular, a payment by installment may be available if necessary. This is described in detail with reference to FIG. 15 as follows.

Figure 15:
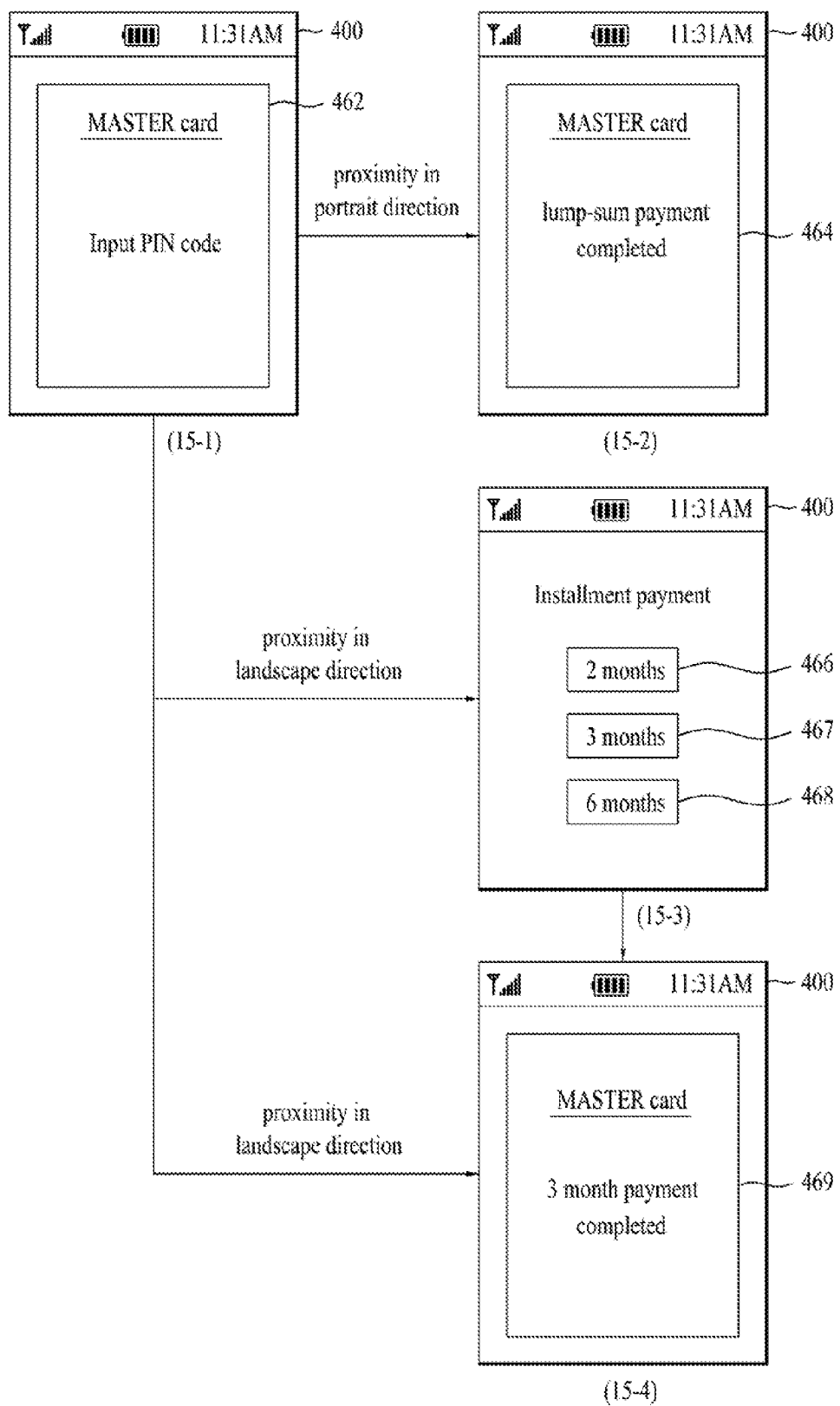

FIG. 15 is a diagram of display screen configurations to implement a method of controlling a mobile terminal according to another embodiment of the present invention.

Referring to FIG. 15 (15-1), when a PIN code transmit grant screen 462 is displayed on the touchscreen 400, assume that a terminal user has granted the PIN code transmission. As mentioned in the foregoing description, it may not be mandatory for the grant of the PIN code transmission to be performed only if the PIN code transmit grant screen 462 is displayed. Since the grant of the PIN code transmission is already mentioned several times in the foregoing description, its details shall be omitted from the following description.

After the PIN code transmission has been granted, the terminal user may be able to move the mobile terminal 100 close to the external payment terminal 200 by aligning the mobile terminal 100 in portrait direction.

If so, the mobile terminal 100 may be able to establish a short range communication for the expense payment with the external payment terminal by the previously set short range communication system.

In consideration of the aligned direction of the mobile terminal in the portrait direction sensed by the sensing unit 140, referring to FIG. 15 (15-2), the controller 180 may control the expense payment to be made in a lump sum for example.

On the other hand, after the PIN code transmission has been granted, the terminal user may be able to move the mobile terminal 100 close to the external payment terminal 200 by aligning the mobile terminal 100 in landscape direction.

If so, the mobile terminal 100 may be able to establish a short range communication for the expense payment with the external payment terminal by the previously set short range communication system.

In consideration of the aligned direction of the mobile terminal in the landscape direction sensed by the sensing unit 140, referring to FIG. 15 (15-3), the controller 180 may control at least two options 466, 467 and 468 for selecting the number of months of the payment by the installment to be displayed for the expense payment.

If the terminal user touches and selects one of the installment month number icons, referring to FIG. 15 (15-4), the controller 180 may control the expense payment to be completed in accordance with the option of the selected number of the months of the payment by installment.

If there is a single option of the installment month number for the expense payment only, referring to FIG. 15 (15-4), the controller 180 does not display the installment month number options but may control the expense payment to be completed in accordance with the single installment month number option.

The aforementioned financial institution list displaying procedure is further explained in detail with reference to FIG. 16 as follows.

Figure 16:
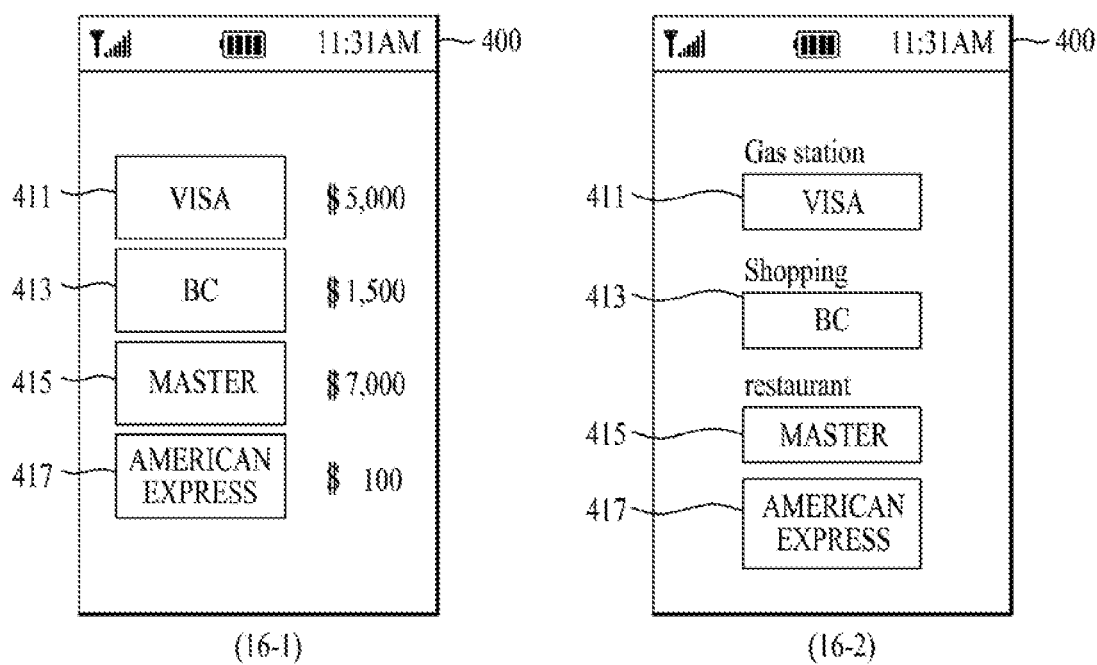

FIG. 16 is a diagram of display screen configurations to implement a method of controlling a mobile terminal according to another embodiment of the present invention.

Referring to FIG. 16 (16-1), when the financial institutions are displayed on the financial institution list, the controller 180 may control a remaining payment limit amount of each of the financial institutions to be displayed as well. In this case, the remaining payment limit amount is deducted by a corresponding amount each time the expense payment is made and is then saved in the memory 160.

Referring to FIG. 16 (16-2), the controller 180 may control the financial institutions in the financial institution list to be displayed in a manner of being divided into at least two categories. For instance, the financial institutions may be displayed in a manner of discriminated from each other by a category of a financial institution having a gasoline discount benefit, a category of a financial institution having a shopping discount benefit and a category of a financial institution having a restaurant discount benefit. As mentioned in the foregoing description, the remaining payment limit amount may be displayable for each of the financial institutions discriminately displayed by categories.

According to the above description, the short range communication of the mobile terminal is used for the expense payment, by which the embodiment of the present invention may be non-limited. For instance, the short range communication of the mobile terminal may be usable to activate or setting a specific function of the mobile terminal. This is described in detail with reference to FIG. 17 as follows.

Figure 17:
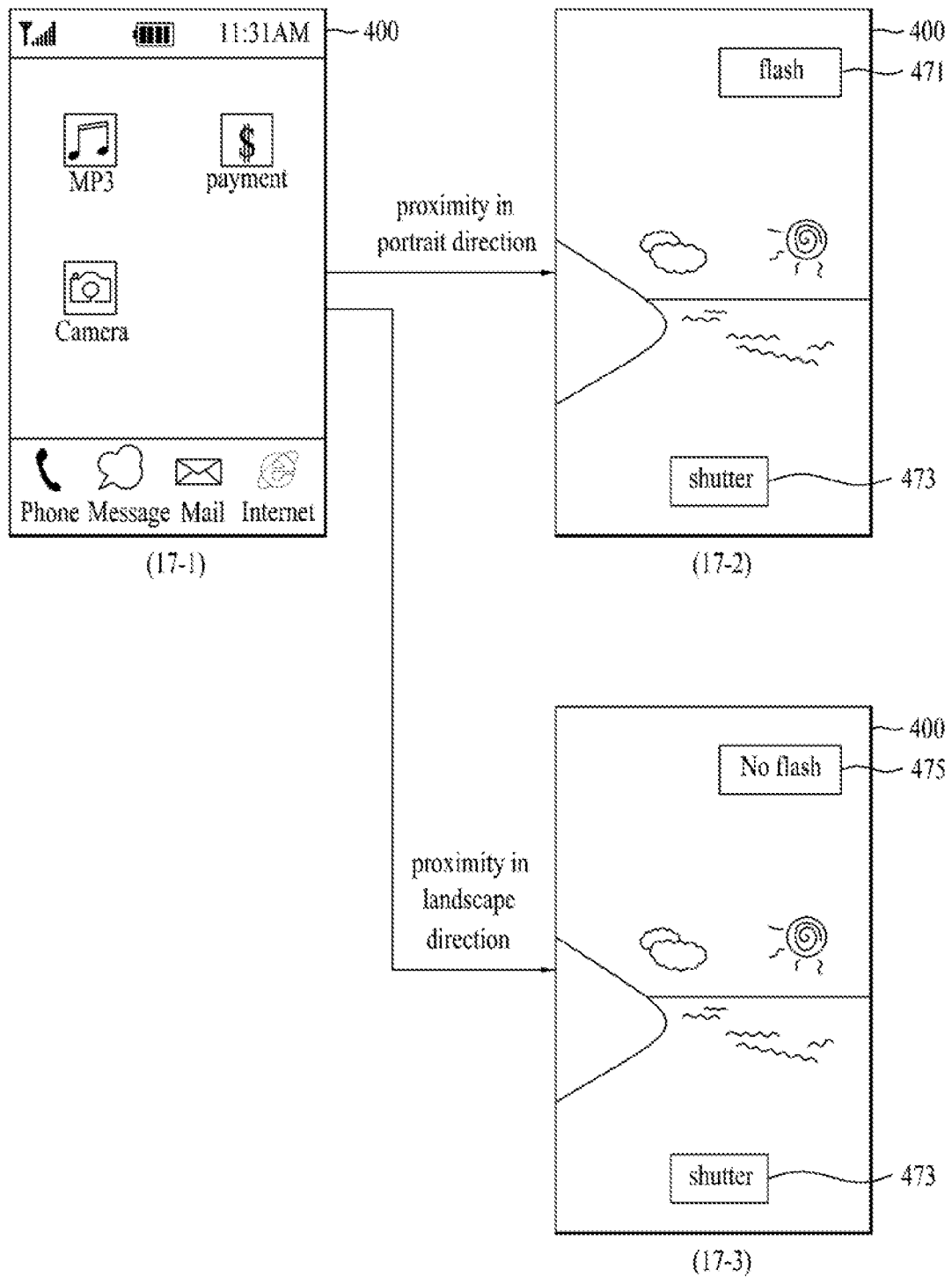

FIG. 17 is a diagram of display screen configurations to implement a method of controlling a mobile terminal according to another embodiment of the present invention.

Referring to FIG. 17 (17-1), while the mobile terminal 100 is in a home screen mode, assume that a home screen is displayed on the touchscreen 400.

A terminal user may move the mobile terminal 100 close to a short range communication tag (e.g., RFID tag, NFC tag, etc.) (Not shown in the drawing) by aligning the mobile terminal 100 in portrait direction. In particular, an application activation command for activating a specific application of the mobile terminal 100 may be inputted to the short range communication tag in advance. In this case, the specific application may include at least one of a multimedia play application, a communication connection application, an internet connection application, a broadcast reception application, a message application, a terminal setting application, an email application and the like, on which no limitation is put. Yet, for clarity and convenience of the following description, assume that the specific application is a camera application.

If so, the controller 180 may control the mobile terminal 100 to establish a short range communication with the short range communication tag by the previously set short range communication system and may control the mobile terminal 100 to receive the camera application activating command from the short range communication tag.

In consideration of the aligned direction of the mobile terminal 100 in the portrait direction sensed by the sensing unit 140, referring to FIG. 17 (17-2), the controller 180 may control the camera function according to the $1^{st}$ function to be activated in the mobile terminal 100. For example, the $1^{st}$ function of the camera application may include at least one of a flash turn-on function, a flash turn-off function, an exposure adjustment function, a focus adjustment function, a white balance function and the like (i.e., one of sub-functions (or settings) of the camera application), on which no limitation is put. FIG. 17 (17-2) shows one example that the 1st function of the camera application is the flash turn-on function.

On the other hand, the terminal user may move the mobile terminal 100 close to a short range communication tag (e.g., RFID tag, NFC tag, etc.) (Not shown in the drawing) by aligning the mobile terminal 100 in landscape direction.

If so, the controller 180 may control the mobile terminal 100 to establish a short range communication with the short range communication tag by the previously set short range communication system and may control the mobile terminal 100 to receive the camera application activating command from the short range communication tag.

In consideration of the aligned direction of the mobile terminal 100 in the landscape direction sensed by the sensing unit 140, referring to FIG. 17 (17-3), the controller 180 may control the camera function according to the $2^{nd}$ function to be activated in the mobile terminal 100. For example, the $2^{nd}$ function of the camera application may include the flash turn-off function for example.

According to the above description, when the mobile terminal 100 in the home screen mode approaches close to the short range communication tag, the specific application of the $1^{st}$ function or the $2^{nd}$ function is activated, by which the embodiment of the present invention may be non-limited.

For instance, when the mobile terminal in the locked mode or the touchscreen-off mode approaches close to the short range communication tag, the specific application of the $1^{st}$ or $2^{nd}$ function may be activated in accordance with the corresponding aligned direction of the mobile terminal 100. Yet, if necessary, in order to prevent the specific application from being activated when the mobile terminal 100 approaches close to the short range communication tag due to an unintentional action of the terminal user, the specific application of the $1^{st}$ or $2^{nd}$ function may be activated in accordance with the corresponding aligned direction of the mobile terminal 100 only if the terminal user moves the mobile terminal 100 close to the short range communication tag by pressing the hard key of the mobile terminal 100.

According to the above description, when the mobile terminal approaches close to the short range communication tag, the specific application of the $1^{st}$ or $2^{nd}$ function is activated in accordance with the aligned direction of the mobile terminal, by which the embodiment of the present invention may be non-limited. For instance, when the mobile terminal approaches close to the short range communication tag, a $1^{st}$ or $2^{nd}$ specific application may be activated in accordance with the aligned direction of the mobile terminal According to the above description, the $1^{st}$ or $2^{nd}$ function (or setting) of the specific application is activated in accordance with the aligned direction of the mobile terminal, by which the embodiment of the present invention may be non-limited. For instance, the $1^{st}$ or $2^{nd}$ function (or setting) of the specific application may be activated in accordance with a current location of the mobile terminal when the mobile terminal approaches close to the short range communication tag. This is described in detail with reference to FIG. 18 and FIG. 19 as follows.

Figure 18:
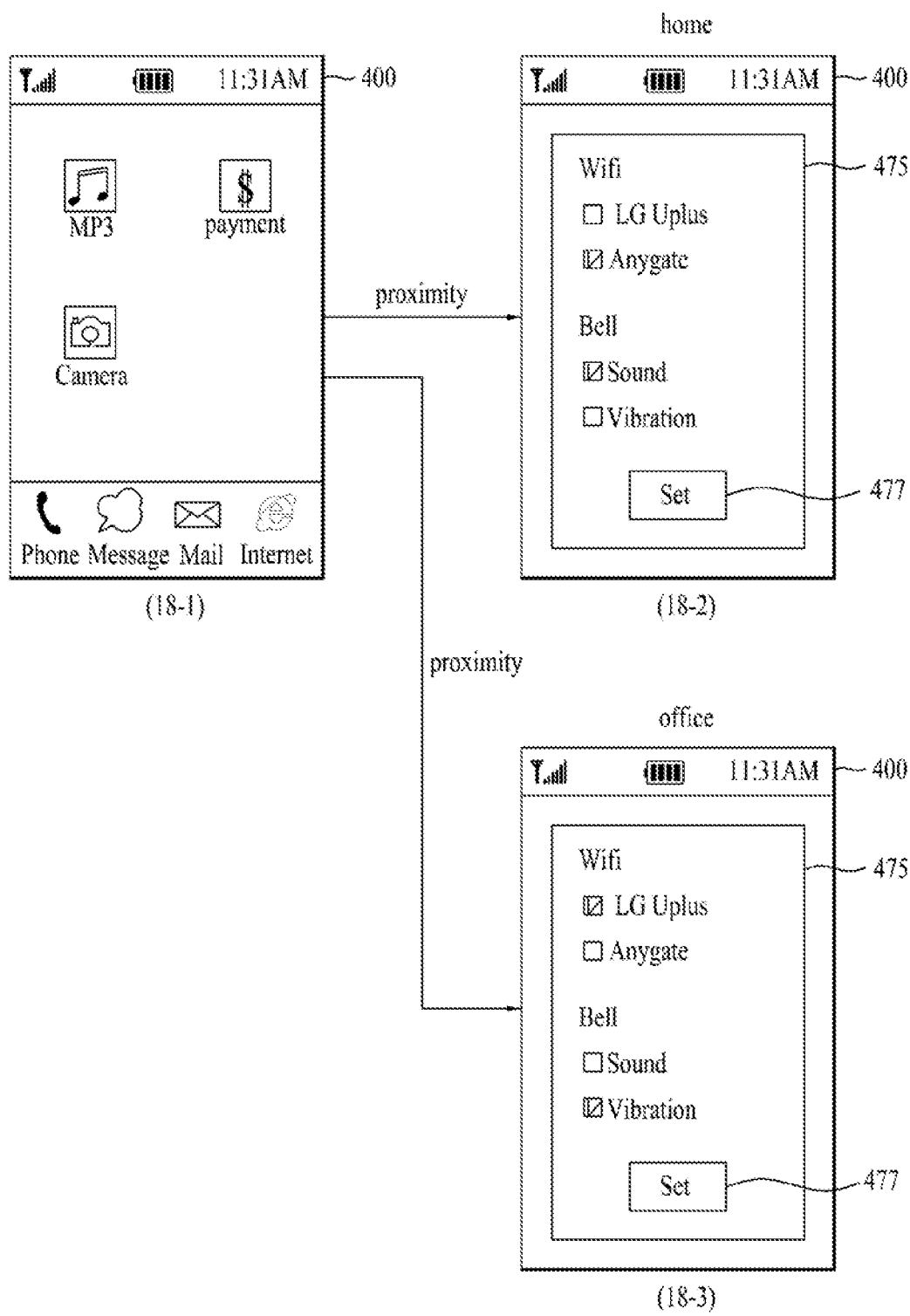
Figure 19:
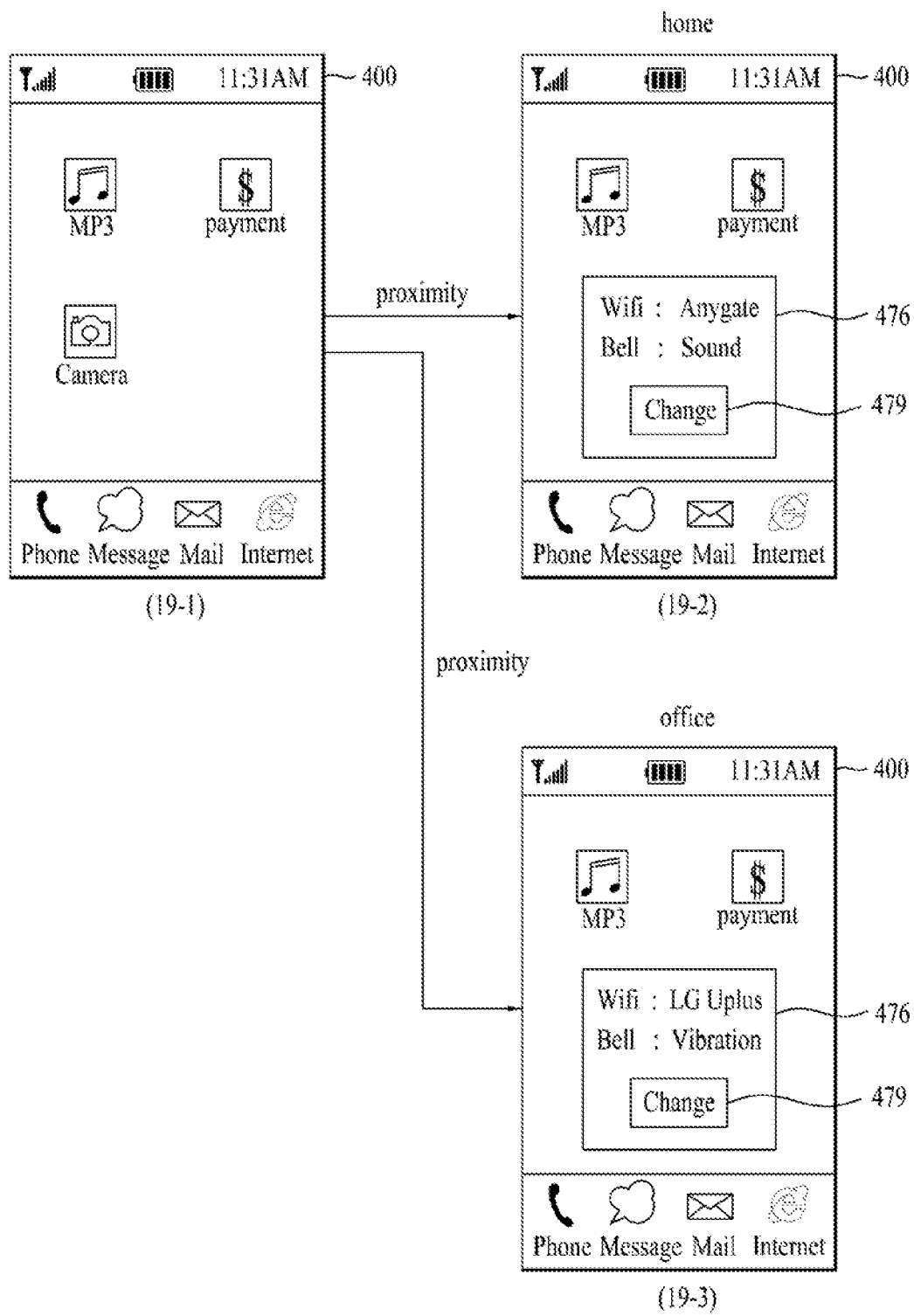

FIG. 18 and FIG. 19 are diagrams of display screen configurations to implement a method of controlling a mobile terminal according to another embodiment of the present invention.

Referring to FIG. 18 (18-1), while the mobile terminal 100 is in a home screen mode, assume that a home screen is displayed on the touchscreen 400.

A terminal user may move the mobile terminal 100 close to the short range communication tag (not shown in the drawing) at a $1^{st}$ location (e.g., home). In doing so, assume that the mobile terminal 100 approaches close to the short range communication tag at the 1st location for the first time. In particular, a command for activating a terminal setting application for a user environment setting of the mobile terminal 100 may be inputted to the short range communication tag in advance.

If so, the controller 180 may control the mobile terminal 100 to establish a short range communication with the short range communication tag by the previously set short range communication system and may control the mobile terminal 100 to receive the command for activating the terminal setting application from the short range communication tag.

In consideration of the $1^{st}$ location of the mobile terminal 100 sensed by the position location module 115 and a fact that the mobile terminal 100 communicates with the short range communication tag at the $1^{st}$ location for the first time, referring to FIG. 18 (18-2), the controller 180 may control a screen 475, which is provided to set a user environment (hereinafter named a $1^{st}$ use environment) at the $1^{st}$ location of the mobile terminal 100, to be displayed on the touchscreen 400. The terminal user may be able to set up the $1^{st}$ use environment in a manner of touching & selecting a desired setting item from the setting screen 475 and then touching a setting icon 477. Thus, the setting of the $1^{st}$ use environment can be completed. The setting-completed $1^{st}$ use environment information may be saved in at least one of the mobile terminal and the short range communication tag.

On the other hand, the terminal user may move the mobile terminal 100 close to the short range communication tag (not shown in the drawing) at a $2^{nd}$ location (e.g., office). In doing so, assume that the mobile terminal 100 approaches close to the short range communication tag at the $2^{nd}$ location for the first time.

If so, the controller 180 may control the mobile terminal 100 to establish a short range communication with the short range communication tag by the previously set short range communication system and may control the mobile terminal 100 to receive the command for activating the terminal setting application from the short range communication tag.

In consideration of the $2^{nd}$ location of the mobile terminal 100 sensed by the position location module 115 and a fact that the mobile terminal 100 communicates with the short range communication tag at the $2^{nd}$ location for the first time, referring to FIG. 18 (18-3), the controller 180 may control a screen 475, which is provided to set a user environment (hereinafter named a $2^{nd}$ use environment) at the $1^{st}$ location of the mobile terminal 100, to be displayed on the touchscreen 400. The terminal user may be able to set up the $2^{nd}$ use environment in a manner of touching & selecting a desired setting item from the setting screen 475 and then touching a setting icon 477. Thus, the setting of the $2^{nd}$ use environment can be completed. The setting-completed $2^{nd}$ use environment information may be saved in at least one of the mobile terminal and the short range communication tag.

In the following description, utilization of the above-set $1^{st}$ and $2^{nd}$ user environments is explained in detail with reference to FIG. 19.

Referring to FIG. 19 (19-1), while the mobile terminal 100 is in a home screen mode, assume that a home screen is displayed on the touchscreen 400. In particular, the mobile terminal 100 may be in the locked mode or the touchscreen-off mode.

A terminal user may move the mobile terminal 100 close to the short range communication tag at a $1^{st}$ location.

If so, the controller 180 may control the mobile terminal 100 to establish a short range communication with the short range communication tag by the previously set short range communication system and may control the mobile terminal 100 to receive the command for activating the terminal setting application from the short range communication tag.

In consideration of the $1^{st}$ location of the mobile terminal 100 sensed by the position location module 115 and a fact that the $1^{st}$ use environment is already set up, referring to FIG. 19 (19-2), the controller 180 may control the mobile terminal 100 to be automatically set according to the $1^{st}$ use environment. If the terminal user attempts to change the $1^{st}$ use environment, the terminal user may be able to change the $1^{st}$ use environment in a manner of touching and selecting a 'change' icon 479 of a $1^{st}$ use environment guide screen 476. If the 'change' icon 479 is touched, the setup screen shown in FIG. 18 (18-2) may be displayed on the touchscreen 400.

On the other hand, the terminal user may move the mobile terminal 100 close to the short range communication tag at a $2^{nd}$ location.

If so, the controller 180 may control the mobile terminal 100 to establish a short range communication with the short range communication tag by the previously set short range communication system and may control the mobile terminal 100 to receive the command for activating the terminal setting application from the short range communication tag.

In consideration of the $2^{nd}$ location of the mobile terminal 100 sensed by the position location module 115 and a fact that the $2^{nd}$ use environment is already set up, referring to FIG. 19 (19-3), the controller 180 may control the mobile terminal 100 to be automatically set according to the $2^{nd}$ use environment. If the terminal user attempts to change the $2^{nd}$ use environment, the terminal user may be able to change the $2^{nd}$ use environment in a manner of touching and selecting a 'change' icon 479 of a $2^{nd}$ use environment guide screen 476. If the 'change' icon 479 is touched, the setup screen shown in FIG. 18 (18-3) may be displayed on the touchscreen 400.

According to the above description, when the mobile terminal approaches close to the short range communication tag, the setup of the mobile terminal is changed in accordance with a current location of the mobile terminal, by which the present invention may be non-limited. For instance, when the mobile terminal approaches close to the short range communication tag, the setup of the mobile terminal may be changed in accordance with at least one of a current location of the mobile terminal and a current time. For another instance, when the mobile terminal approaches close to the short range communication tag, a different application may be activated in the mobile terminal in accordance with at least one of a current location of the mobile terminal and a current time.

In the following description, when the mobile terminal approaches close to the short range communication tag, a process for activating a different application in the mobile terminal in accordance with an aligned direction of the approaching mobile terminal is explained with reference to FIG. 20.

FIG. 20 is a diagram of display screen configurations to implement a method of controlling a mobile terminal according to another embodiment of the present invention.

Referring to FIG. 20 (20-1), while a multimedia play application is active in the mobile terminal 100, a multimedia play screen 481 may be displayed on the touchscreen 400.

In doing so, a terminal user may move the mobile terminal close to the short range communication tag by aligning the mobile terminal 100 in landscape direction. For instance, the short range communication tag may be built in a holder of the mobile terminal within a vehicle.

If so, the controller 180 may control the mobile terminal 100 to establish a short range communication with the short range communication tag by the previously set short range communication system.

In consideration of the establishment of the short range communication and the aligned direction of the mobile terminal sensed by the sensing unit 140, the controller 180 controls the navigation application to be activated in the mobile terminal 100 and also controls a navigation screen 483 to be displayed on the touchscreen 400 [FIG. 20 (20-2)].

On the other hand, the terminal user may move the mobile terminal close to the short range communication tag by aligning the mobile terminal 100 in portrait direction.

If so, the controller 180 may control the mobile terminal 100 to establish a short range communication with the short range communication tag by the previously set short range communication system.

In consideration of the establishment of the short range communication and the aligned direction of the mobile terminal sensed by the sensing unit 140, the controller 180 controls the multimedia play application to be activated in the mobile terminal 100 and also controls a multimedia play screen 481 to be displayed again on the touchscreen 400 [FIG. 20 (20-1)].

Meanwhile, assume that the mobile terminal 100 approaches close to the short range communication tag built in a business card of a third party in portrait direction. And, assume that personal information (e.g., contact information included) on the $3^{rd}$ party may be contained in the short range communication tag.

If so, the controller 180 may control the mobile terminal 100 to establish a short range communication with the short range communication tag by the previously set short range communication system.

In consideration of the establishment of the short range communication and the aligned direction of the mobile terminal sensed by the sensing unit 140, referring to FIG. 20 (20-3), the controller 180 receives the contact information from the short range communication tag and controls a screen 485, which is provided to make a phone call to the $3^{rd}$ party in accordance with the received contact information, to be displayed on the touchscreen 400.

On the other hand, assume that the mobile terminal 100 approaches close to the short range communication tag built in a business card of a third party in landscape direction.

If so, the controller 180 may control the mobile terminal 100 to establish a short range communication with the short range communication tag by the previously set short range communication system.

In consideration of the establishment of the short range communication and the aligned direction of the mobile terminal sensed by the sensing unit 140, referring to FIG. 20 (20-4), the controller 180 receives the personal information from the short range communication tag and controls the received personal information to be displayed on the touchscreen 400.

In the following description, when the mobile terminal approaches close to the short range communication tag, a process for activating a specific application (e.g., a voice recording application, etc.) in the mobile terminal in accordance with an ambient light is explained in detail with reference to FIG. 21.

Figure 21:
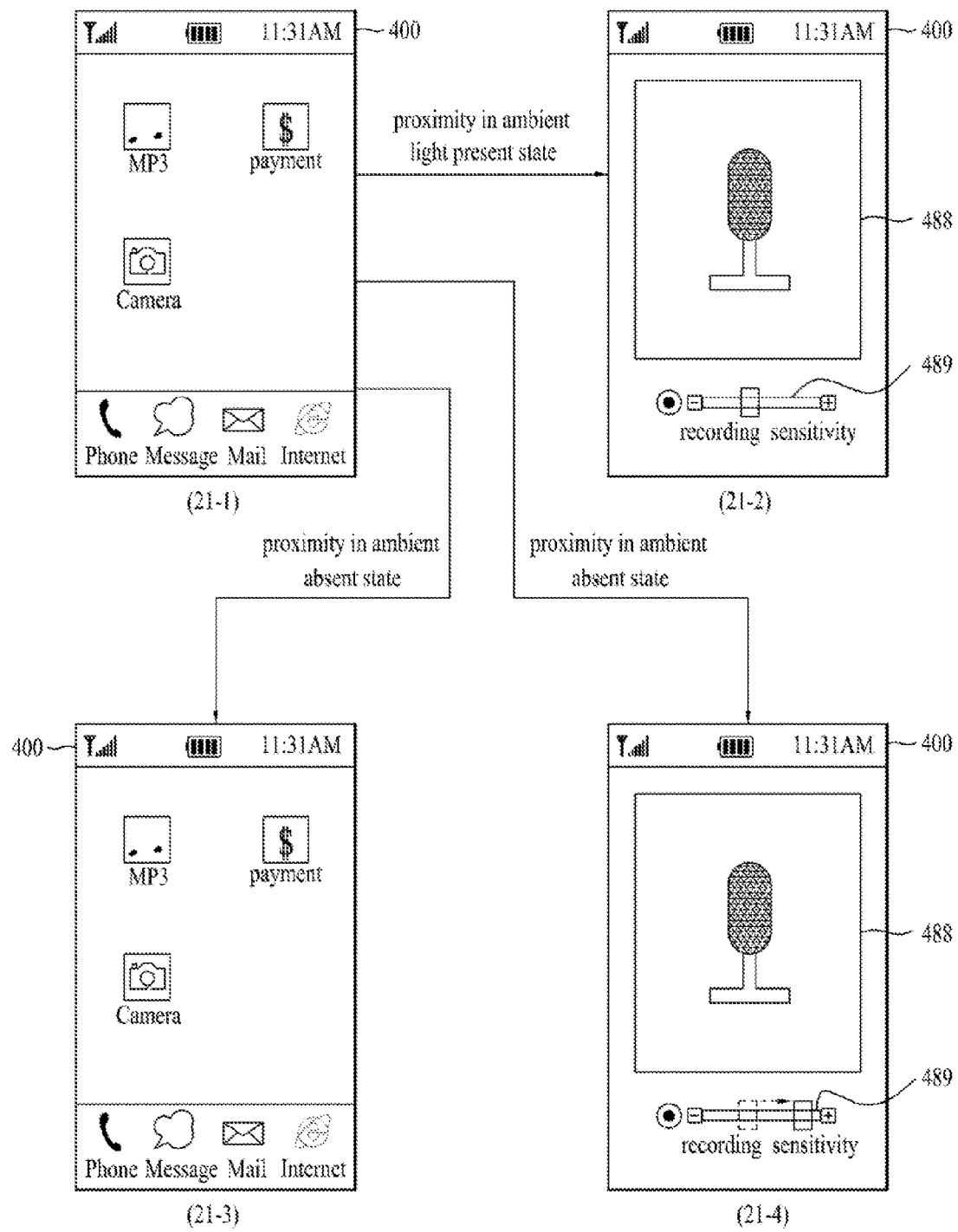

FIG. 21 is a diagram of display screen configurations to implement a method of controlling a mobile terminal according to another embodiment of the present invention.

Referring to FIG. 21 (21-1), while the mobile terminal 100 is in a home screen mode, assume that a home screen is displayed on the touchscreen 400. In particular, the mobile terminal 100 may be in the locked mode or the touchscreen-off mode.

A terminal user may move the mobile terminal 100 close to the short range communication tag.

If so, the controller 180 may control the mobile terminal 100 to establish a short range communication with the short range communication tag by the previously set short range communication system and may control the mobile terminal 100 to receive a command for activating the voice recording application from the short range communication tag.

If the sensing unit 140 senses that the ambient light of the mobile terminal 100 is equal to or higher than a predetermined level, referring to FIG. 21 (21-1), the controller 180 controls the voice recording application to be automatically activated in the mobile terminal 100 and controls a voice recording application screen 488 to be displayed on the touchscreen 400.

On the contrary, if the sensing unit 140 senses that the ambient light of the mobile terminal 100 is not equal to or higher than a predetermined level, referring to FIG. 21 (21-2), the controller 180 may control the voice recording application not to be automatically activated in the mobile terminal 100. When the mobile terminal 100 is placed in bag or pocket of the terminal user for example, the ambient light of the mobile terminal is lower than the predetermined level. Hence, it may be able to take care of the case that the mobile terminal unintentionally approaches close to the short range communication tag.

On the other hand, if the sensing unit 140 senses that the ambient light of the mobile terminal 100 is not equal to or higher than a predetermined level, referring to FIG. 21 (21-3), the controller 180 controls the voice recording application to be automatically activated in the mobile terminal 100 and also controls a voice recording sensitivity to be raised. In the voce recording application screen 488 shown in FIG. 21 (21-3), a recording sensitivity icon 489 is automatically shifted to have a recording sensitivity better than that shown in FIG. 21 (21-2). When the mobile terminal 100 is placed in bag or pocket of the terminal user for example, the ambient light of the mobile terminal is lower than the predetermined level. Hence, it may be able to take care of the case that the recording sensitivity needs to be raised.

In the following description, utilization of a $2^{nd}$ short range communication tag for connection/disconnection of a $1^{st}$ short range communication between the mobile terminal and a peripheral communication device is explained with reference to FIG. 22. In the following description, assume that the $1^{st}$ short range communication includes Bluetooth communication and that the $2^{nd}$ short range communication includes NFC (near field communication).

FIG. 22 is a diagram for an environment of a short range communication between a mobile terminal and a peripheral communication device according to the present invention. In the following description, assume that the peripheral communication device may include a notebook computer for example and that an NFC chip (not shown in the drawing) is built in the notebook computer.

Referring to FIG. 22 (22-1), the mobile terminal 100 and the notebook computer 300 are connected with each other via Bluetooth communication.

Referring to FIG. 22 (22-1), the mobile terminal 100 may move away from the notebook computer 300.

In response to the movement of the mobile terminal 100 sensed by the sensing unit 140, the controller 180 controls the short range communication module 114 to attempt NFC communication with the NFC chip in the notebook computer 300.

If the NFC communication with the NFC chip is successful, the controller 180 may control the Bluetooth paring between the mobile terminal 100 and the notebook computer 300 to be maintained as it is.

If the NFC communication with the NFC chip fails, the controller 180 may control the Bluetooth paring between the mobile terminal 100 and the notebook computer 300 to be canceled.

Accordingly, embodiments of the present invention provide various effects and/or features as follows.

First of all, according to at least one of embodiments of the present invention, a strict authentication procedure for expense payment can be performed via a simple and convenient user interface between a mobile terminal and a terminal user. In particular, since at least one of a selection and authentication of a payment means of the mobile terminal can be performed via at least one of an aligned direction, a moving direction and a moving track of the mobile terminal, the user interface between the mobile terminal and the terminal user for the expense payment can be further simplified.

Moreover, at least one of an aligned direction, a moving direction and a moving track of the mobile terminal, is not usable for at least one of a selection and authentication of a payment means of the mobile terminal only but may be usable for at least one of a selection, activation and manipulation of an application for another usage as well as the payment of the mobile terminal.

Secondly, according to at least one of embodiments of the present invention, when an expense payment is made in the mobile terminal, a back account or a credit card may be easily and conveniently selected by a terminal user.

In addition, described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrierwave type implementations (e.g., transmission via Internet). Further, the computer can include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
 a touchscreen configured to display information;
 a short-range wireless communication unit; and
 a controller configured to:
 while in an unlocked state cause the touchscreen to display a home screen, and cause the touch screen to display a payment card information in response to receiving a first gesture input while the home screen is displayed;
 while a locked screen is displayed in a locked state, cause the touchscreen to display the payment card information in response to a second gesture input on the lock screen;
 cause the touchscreen to display the payment card information in response to a third gesture input received while a display of the touchscreen is off;
 receive personal authentication information via a user input unit;
 authenticate the received personal authentication information for the displayed payment card information;
 cause the wireless communication unit to transmit payment information associated with the displayed payment card information to an external payment terminal, wherein the payment information is transmitted to the external payment terminal after the received personal authentication information is authenticated; and
 cause the touchscreen to display an indicator indicating completion of payment based on the transmitted payment information.

2. The mobile terminal of claim 1, wherein the controller is further configured to cause the touchscreen to display the home screen in response to a fourth gesture input received while the lock screen is displayed, and the fourth gesture input while the lock screen is displayed comprises a touch and drag input to the touchscreen while in the locked state.

3. The mobile terminal of claim 1, wherein at least one of the first, second or third gesture input comprises an initial touch to a location proximate to an edge of the touchscreen and a drag of the initial touch toward an inner portion of the touchscreen.

4. The mobile terminal of claim 1, wherein at least one of the first, second or third gesture input comprises an initial touch to a location proximate to a first edge of the touchscreen and a drag of the initial touch toward a second edge of the touchscreen opposite the first edge.

5. The mobile terminal of claim 1, wherein the first gesture input while the home screen is displayed also comprises a touch and drag input to the touchscreen.

6. The mobile terminal of claim 1, further comprising a sensor configured to sense a movement of the mobile terminal, wherein the third gesture input received while the display of the touchscreen is off comprises a movement of the mobile terminal sensed via the sensor.

7. The mobile terminal of claim 1, wherein the controller is further configured to cause the touchscreen to display indicators corresponding to at least a first payment method and a second payment method while the lock screen is displayed.

8. The mobile terminal of claim 7, wherein:
 the second gesture input while the lock screen is displayed comprises at least a directed drag input in a direction corresponding to the second payment method; and
 the controller is further configured to select the second payment method in response to the directed drag input.

9. The mobile terminal of claim 1, wherein the controller is further configured to:
 cause the touchscreen to display another payment card information in response to a touch swipe input while the payment card information is displayed,
 wherein the transmitted payment information corresponds to the another payment card information.

10. The mobile terminal of claim 1, wherein the mobile terminal corresponds to at least one of a mobile phone, an user equipment, a smart phone, a mobile computer, a digital broadcast terminal, a personal digital assistant, a portable multimedia player (PMP) or a navigator.

11. A method of controlling a mobile terminal for a payment, the method comprising:
 displaying a home screen on a touchscreen of the mobile terminal while in an unlocked state, and displaying a payment card information in response to receiving a first gesture input while the home screen is displayed;
 displaying a lock screen on the touchscreen while in a locked state;
 while the locked screen is displayed in the locked state, displaying the payment card information in response to a second gesture input on the lock screen;
 displaying the payment card information in response to a third gesture input received while a display of the touchscreen is off;
 receiving personal authentication information via a user input unit;
 authenticating the received personal authentication information for the displayed payment card information;
 transmitting payment information associated with the displayed payment card information to the external payment terminal, wherein the payment information is transmitted to the external payment terminal after the received personal authentication information is authenticated; and
 displaying an indicator indicating completion of payment based on the transmitted payment information.

12. The method of claim 11, further comprising displaying the home screen in response to a fourth gesture input received while the lock screen is displayed, wherein the fourth gesture input while the lock screen is displayed comprises a touch and drag input to the touchscreen while in the locked state.

13. The method of claim 11, wherein at least one of the first, second or third gesture input comprises an initial touch to a location proximate to an edge of the touchscreen and a drag of the initial touch toward an inner portion of the touchscreen.

14. The method of claim 11, wherein at least one of the first, second or third gesture input comprises an initial touch to a location proximate to a first edge of the touchscreen and a drag of the initial touch toward a second edge of the touchscreen opposite the first edge.

15. The method of claim 11, wherein the first gesture input while the home screen is displayed also comprises a touch and drag input to the touchscreen.

16. The method of claim 11, further comprising a sensor configured to sense a movement of the mobile terminal, wherein the third gesture input received while the display of the touchscreen is off comprises a movement of the mobile terminal sensed via the sensor.

17. The method of claim 11, further comprising displaying indicators corresponding to at least a first payment method and a second payment method while the lock screen is displayed.

18. The method of claim 17, wherein:
the second gesture input while the lock screen is displayed comprises at least a directed drag input in a direction corresponding to the second payment method; and
selecting the second payment method in response to the directed drag input.

19. The method of claim 11, further comprising:
displaying another payment card information in response to a touch swipe input while the payment card information is displayed,
wherein the transmitted payment information corresponds to the another payment card information.

20. A mobile terminal comprising;
a short-range wireless communication unit;
a memory configured to store a payment application;
a touchscreen configured to display information; and
a controller operably coupled to the short-range wireless communication unit and the touchscreen, and configured to:
display a home screen on the touchscreen in a unlocked screen mode;
receive a first gesture input on the displayed home screen;
display a payment card information on the touchscreen in response to the first gesture input on the displayed home screen;
display a lock screen on the touchscreen in a locked screen mode;
while the locked screen is displayed in the locked state, display the payment card information on the touchscreen in response to a second gesture input on the displayed lock screen;
display the payment card information on the touchscreen in response to a third gesture input received while a display of the touchscreen is off;
receive personal authentication information via a user input unit;
authenticate the received personal authentication information for the displayed payment card information;
communicate payment information associated with the displayed card information to an external payment terminal based on the payment application via the wireless communication unit, wherein the payment information is communicated to the external payment terminal after the received personal authentication information is authenticated; and
display an indicator indicating completion of payment based on the communicated payment information.

21. The mobile terminal of claim 1, wherein the received personal authentication information comprises individual authentication information for the displayed payment card information.

22. The mobile terminal of claim 1, wherein the received personal authentication information comprises universal authentication information for all payment card information stored at the mobile terminal.

23. The mobile terminal of claim 1, wherein the received personal authentication information comprises at least one of individual authentication information for the displayed payment card information and universal authentication information for all payment card information stored at the mobile terminal.

24. The mobile terminal of claim 11, wherein the received personal authentication information comprises individual authentication information for the displayed payment card information.

25. The mobile terminal of claim 11, wherein the received personal authentication information comprises universal authentication information for all payment card information stored at the mobile terminal.

26. The mobile terminal of claim 11, wherein the received personal authentication information comprises at least one of individual authentication information for the displayed payment card information and universal authentication information for all payment card information stored at the mobile terminal.

27. The method of claim 20, wherein the received personal authentication information comprises individual authentication information for the displayed payment card information.

28. The method of claim 20, wherein the received personal authentication information comprises universal authentication information for all payment card information stored at the mobile terminal.

29. The method of claim 20, wherein the received personal authentication information comprises at least one of individual authentication information for the displayed payment card information and universal authentication information for all payment card information stored at the mobile terminal.

* * * * *